US007150037B2

(12) United States Patent
Wolf et al.

(10) Patent No.: US 7,150,037 B2
(45) Date of Patent: Dec. 12, 2006

(54) NETWORK CONFIGURATION MANAGER

(75) Inventors: Jonathan S. Wolf, Belmont, MA (US); Arthur B. Mellor, Arlington, MA (US); Wayne F. Tackabury, West Tisbury, MA (US); Christopher B. Anderson, Newton, MA (US); Robin M. Whitworth, Belmont, MA (US); Michael D. Haag, Malden, MA (US); Brian A. Del Vecchio, Cambridge, MA (US)

(73) Assignee: Intelliden, Inc., Colorado Springs, CO (US)

( * ) Notice: Subject to any disclaimer, the term of this patent is extended or adjusted under 35 U.S.C. 154(b) by 774 days.

(21) Appl. No.: 09/877,209

(22) Filed: Jun. 8, 2001

(65) Prior Publication Data

US 2002/0178380 A1 Nov. 28, 2002

Related U.S. Application Data

(60) Provisional application No. 60/277,669, filed on Mar. 21, 2001.

(51) Int. Cl.
*G06F 7/04* (2006.01)
(52) U.S. Cl. .................. 726/6; 726/3; 726/4; 726/5; 726/17; 713/201
(58) Field of Classification Search ................ 713/201; 370/254; 726/3–6, 17
See application file for complete search history.

(56) References Cited

U.S. PATENT DOCUMENTS 4,991,089 A   2/1991   Shorter
(Continued)

FOREIGN PATENT DOCUMENTS

EP   0 384 339 A2   8/1990

(Continued)

OTHER PUBLICATIONS

Lewis, L., "*Policy-Based Configuration Management: A Perspective from a Network Management Vendor*," http://www.simple-times,org./pub/simple-times/issues/8-1.html, pp. 7-27.
(Continued)

*Primary Examiner*—Ayaz Sheikh
*Assistant Examiner*—Pramila Parthasarathy
(74) *Attorney, Agent, or Firm*—Cooley Godward LLP

(57) ABSTRACT

A policy engine generates configlets that are vendor-neutral, vendor-specific or both, based on a selected target level and a selected device/device group. A translator translates and combines the configlets to form vendor-dependent configuration files. The policy engine generates the configlets using policies associated with the selected target level and its sub-target levels, as defined by a target level hierarchy. A policy includes at least a condition, and an action which the policy engine performs if the condition is true. In performing the action, the policy engine typically writes to at least a partial configlet. A policy may further include a verification clause, which is used to verify a running configuration. Policy dependencies may also be defined such that where a second policy is dependent on a first policy, the second policy must be evaluated after the first policy. This is necessary, where, for example, the first policy generates and stores a value to be used by the second policy. Policies are small programs. A configlet hierarchy is defined, such that a child configlet inherits properties which it does not define from its parent. A mapping function maps infrastructure data in a first format to a second format, so that the second format is recognizable by the policy engine. A loader batches, schedules and loads a configuration file to its intended device. Upon replacing a first device using a first configuration format with a second device using a second configuration format, the first device's configuration is read in or uploaded and reverse-translated into configlets. The configlets are then translated into a configuration formatted for the second device. The system retains device logins and passwords in encrypted format. A user desiring to connect to a device must log in to the system instead. The system in turn logs in or connects to the device and passes information back and forth between the user and the device, as if the user were logged directly into the device.

8 Claims, 22 Drawing Sheets

U.S. PATENT DOCUMENTS

| | | |
|---|---|---|
| 5,109,486 A | 4/1992 | Seymour |
| 5,159,685 A | 10/1992 | Kung |
| 5,442,791 A | 8/1995 | Wrabetz et al. |
| 5,475,819 A * | 12/1995 | Miller et al. ............... 709/203 |
| 5,491,820 A | 2/1996 | Belove et al. |
| 5,519,704 A | 5/1996 | Farinacci et al. |
| 5,557,748 A | 9/1996 | Noris |
| 5,581,764 A | 12/1996 | Fitzgerald et al. |
| 5,724,509 A | 3/1998 | Starkweather et al. |
| 5,726,883 A | 3/1998 | Levine et al. |
| 5,751,967 A * | 5/1998 | Raab et al. ................ 709/228 |
| 5,764,955 A | 6/1998 | Doolan |
| 5,784,702 A | 7/1998 | Greenstein et al. |
| 5,787,246 A | 7/1998 | Lichtman et al. |
| 5,796,732 A | 8/1998 | Mazzola et al. |
| 5,819,028 A | 10/1998 | Manghirmalani et al. |
| 5,832,503 A | 11/1998 | Malik et al. ................ 707/104 |
| 5,838,918 A | 11/1998 | Prager et al. |
| 5,842,040 A | 11/1998 | Hughes et al. |
| 5,852,740 A | 12/1998 | Estes |
| 5,872,928 A | 2/1999 | Lewis et al. ............ 395/200.52 |
| 5,884,028 A | 3/1999 | Kindell et al. |
| 5,889,953 A | 3/1999 | Thebaut et al. .......... 395/200.51 |
| 5,920,701 A | 7/1999 | Miller et al. |
| 5,944,782 A | 8/1999 | Noble et al. |
| 5,948,065 A | 9/1999 | Eilert et al. |
| 5,956,341 A | 9/1999 | Galand et al. |
| 5,961,594 A | 10/1999 | Bouvier et al. |
| 5,968,122 A | 10/1999 | Schlosser et al. |
| 5,968,176 A * | 10/1999 | Nessett et al. ............... 713/201 |
| 5,974,236 A | 10/1999 | Sherman |
| 5,980,078 A | 11/1999 | Krivoshein et al. |
| 5,999,948 A * | 12/1999 | Nelson et al. ............... 715/506 |
| 6,006,035 A | 12/1999 | Nabahi |
| 6,016,306 A | 1/2000 | Le Boudec et al. |
| 6,023,586 A | 2/2000 | Gaisford et al. |
| 6,028,846 A | 2/2000 | Cain |
| 6,041,347 A | 3/2000 | Harsham et al. |
| 6,049,828 A | 4/2000 | Dev et al. |
| 6,055,568 A | 4/2000 | Adams |
| 6,097,697 A | 8/2000 | Yao et al. |
| 6,098,094 A | 8/2000 | Barnhouse et al. |
| 6,098,101 A | 8/2000 | Sears |
| 6,098,108 A | 8/2000 | Sridhar et al. |
| 6,101,508 A | 8/2000 | Wolff |
| 6,104,700 A | 8/2000 | Haddock et al. |
| 6,105,069 A | 8/2000 | Franklin et al. |
| 6,108,699 A | 8/2000 | Moiin |
| 6,108,703 A | 8/2000 | Leighton et al. |
| 6,122,664 A | 9/2000 | Boukobza et al. |
| 6,128,729 A | 10/2000 | Kimball et al. |
| 6,131,118 A | 10/2000 | Stupek, Jr. et al. |
| 6,131,119 A | 10/2000 | Fukui |
| 6,154,776 A | 11/2000 | Martin |
| 6,167,445 A * | 12/2000 | Gai et al. .................... 709/223 |
| 6,170,009 B1 * | 1/2001 | Mandal et al. ............... 709/223 |
| 6,170,011 B1 | 1/2001 | Macleod Beck et al. |
| 6,182,094 B1 | 1/2001 | Humpleman et al. |
| 6,198,479 B1 | 3/2001 | Humpleman et al. |
| 6,202,090 B1 | 3/2001 | Simone |
| 6,243,747 B1 | 6/2001 | Lewis et al. |
| 6,260,072 B1 | 7/2001 | Rodriguez-Moral |
| 6,269,398 B1 | 7/2001 | Leong et al. |
| 6,292,889 B1 | 9/2001 | Fitzgerald et al. |
| 6,349,306 B1 * | 2/2002 | Malik et al. ............. 707/103 R |
| 6,356,955 B1 | 3/2002 | Hollberg et al. |
| 6,363,411 B1 | 3/2002 | Dugan et al. |
| 6,370,119 B1 | 4/2002 | Basso et al. |
| 6,381,631 B1 | 4/2002 | Van Hoff |
| 6,393,425 B1 | 5/2002 | Kelly |
| 6,418,468 B1 * | 7/2002 | Ahlstrom et al. ........... 709/223 |
| 6,438,594 B1 | 8/2002 | Bowman-Amuah |
| 6,442,608 B1 | 8/2002 | Knight et al. |
| 6,449,638 B1 | 9/2002 | Wecker et al. |
| 6,463,583 B1 | 10/2002 | Hammond |
| 6,496,843 B1 | 12/2002 | Getchius et al. |
| 6,539,425 B1 * | 3/2003 | Stevens et al. ............. 709/220 |
| 6,550,060 B1 | 4/2003 | Hammond |
| 6,567,406 B1 | 5/2003 | Skemer |
| 6,609,108 B1 | 8/2003 | Pulliam et al. |
| 6,615,166 B1 | 9/2003 | Guheen et al. |
| 6,625,590 B1 | 9/2003 | Chen et al. |
| 6,636,877 B1 | 10/2003 | Doleac et al. |
| 6,643,640 B1 | 11/2003 | Getchius et al. |
| 6,654,799 B1 | 11/2003 | Tanaka |
| 6,658,526 B1 | 12/2003 | Nguyen et al. |
| 6,678,827 B1 * | 1/2004 | Rothermel et al. ......... 713/201 |
| 6,684,244 B1 * | 1/2004 | Goldman et al. ........... 709/223 |
| 6,697,967 B1 | 2/2004 | Robertson |
| 6,725,233 B1 | 4/2004 | Froyd et al. |
| 6,769,116 B1 | 7/2004 | Sexton |
| 6,775,698 B1 | 8/2004 | Simone |
| 6,826,597 B1 | 11/2004 | Lonnroth et al. |
| 2002/0032769 A1 | 3/2002 | Barkai et al. |
| 2002/0038320 A1 | 3/2002 | Brook |
| 2002/0051080 A1 | 5/2002 | Tanaka |
| 2002/0171762 A1 | 11/2002 | Maxson et al. |
| 2002/0174091 A1 | 11/2002 | Froyd et al. |
| 2002/0191619 A1 | 12/2002 | Shafer |
| 2002/0198974 A1 | 12/2002 | Shafer |
| 2003/0033583 A1 | 2/2003 | Reyna et al. |
| 2003/0037040 A1 | 2/2003 | Beadles et al. |
| 2003/0048287 A1 | 3/2003 | Little et al. |
| 2003/0135508 A1 | 7/2003 | Chorafakis et al. |
| 2004/0078695 A1 | 4/2004 | Bowers et al. |
| 2004/0225865 A1 | 11/2004 | Cox et al. |

FOREIGN PATENT DOCUMENTS

| | | |
|---|---|---|
| EP | 0 810 755 A2 | 12/1997 |
| EP | 0 762 281 A3 | 3/1999 |
| EP | 0 973 296 A2 | 1/2000 |
| EP | 1 011 230 A2 | 6/2000 |
| EP | 1 012 726 A1 | 6/2000 |
| EP | 1 026 867 A2 | 8/2000 |
| EP | 1 047 226 A2 | 10/2000 |
| EP | 1 090 492 A1 | 4/2001 |
| EP | 1 091 526 A2 | 4/2001 |
| GB | 2 368 692 A | 5/2002 |
| WO | WO 95/08794 | 3/1995 |
| WO | WO 95/24802 A | 9/1995 |
| WO | WO 97/49214 | 12/1997 |
| WO | WO 98/18235 A | 4/1998 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01/01293 A2 | 1/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

Waldbusser, St., et al., "*Policy Based Management MIB*," http://www.ietf.org/internet-drafts/draft-ietf-snmpconf-pm-05.txt, pp. 1-102.

"FFST/2 Generic Alert Router for LAN and SNA Transports," IBM Technical Disclosure Bulletin, IBM Corp. New York, US, vol. 34, No. 11, Apr. 1, 1992, pp. 467-468, XP000303331, ISSN: 0018-8689.

ISM Customer—Aware™ Deep Discovery™; CoManage Corporation; As of Dec. 5, 2000 (2 pages).

ISM Customer—Aware™ Fault and Performance Management; CoManage Corporation; As of Dec. 5, 2000 (2 pages).

ISM Customer—Aware™ Provisioning; CoManage Corporation; As of Dec. 5, 2000 (2 pages).

ISM Customer—Aware™ Query; CoManage Corporation; As of Dec. 5, 2000 (2 pages).

ISM Customer—Aware™ Service Profiling; CoManage Corporation; As of Dec. 5, 2000 (2 pages).

Kennedy T W: "Network Operations & Management Tool Requirements for the 90s" Proceedings of the Network Operations and Management Symposium (NOMS). Memphis, Apr. 6-9, 1992, New York, IEEE, U.S. vol. 1, 1992, pp. 122-132.

Lee, W.C. et al: "Routing Subject to Quality of Service Constraints in Integrated Communication Networks" IEEE Network, IEEE Inc. New York, US, vol. 9, No. 4, Jul. 1, 1995, pp. 46-55, XP000526591, ISSN: 0890-8044 the whole document.

Managing Managed Network Services: The Service Provider Blind Spot; Infonetics Research, The Networking Information Source; Jun. 2000 (18 pages).

PCT/US 01/45668—International Search Report dated Oct. 16, 2002.

PCT/US 01/45669—International Search Report dated Oct. 16, 2002.

PCT/US 01/45670—International Search Report dated Dec. 20, 2002.

PCT/US 01/45671—International Search Report dated Oct. 16, 2002.

PCT/US 01/45671—Written Opinion dated Dec. 13, 2002.

PCT/US 01/45672—International Search Report dated Apr. 14, 2003.

Torrente, S, et al: "Implementation of the ANSI TI M1.5 GBM-T1. 214 within an ODBMS framework" Networking: Foundation for the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 CONF. 12, Mar. 28, 1993, pp. 875-884, XP010032227, ISBN: 0-8186-3580-0.

Williams, R. "Web Based Enterprise Management W101" DMTF 1999 Annual Conference, 'Online! Jun. 15-16, 1999, pp. 1-21.

Wolfson, Ouri et al.: "Managing Communication Networks by Monitoring Databases", IEEE Transactions on Software Engineering, IEEE Inc. New York, US, vol. 17, No. 9, Sep. 1, 1991, pp. 944-953.

Deca, Rudy, Cherkaoui, Omar, and Puche, Daniel, *A Validation Solution for Network Configuration*, Jan. 2002, pp. 1-17.

Lonvick, C. The BSD syslog Protocol. RFC 3164 [online], Aug. 2001 [retrieved on Mar. 25, 2002]. Retrieved from the Internet, <url: HTTP://www.ietf.org/rfc/rfc3164.txt>.

Case, J., A Simple Network Management Protocol (SNMP). RFC 1098 [online], Apr. 1989 [retrieved on Mar. 26, 2002]. Retrieved from the internet <URL: http://www.ietf.org/rfc/rfc1098.txt?number=1098>.

Postel, J.B. Simple Mail Transfer Protocol. RFC 821 [online], Aug. 1982 [retrieved on Mar. 26, 2002]. Retrieved from the Internet <URL: http:///www.ietf.org/rfc/rfc0821.txt?number=821>.

Finseth, C. An Access Control Protocol, Sometimes called TACACS. RFC 1492 [online], Jul. 1993 [retrieved on Mar. 25, 2002]. Retrieved from the Internet <URL: http://www.cis.ohio-state.edu/cgi-bin/rfc/rfc1492.html>.

Anderson, B.A. TACACS User Identification Telnet Option. RFC 927 [online], Dec. 1984 [retrieved on Mar. 25, 2002]. Retrieved from the Internet <URL: http://www.ietf/org/rfc/rfc0927.txt>.

Rigney, C., et al. Remote Authentication Dial In User Service (RADIUS). RFC 2138 [online], Apr. 1997 [retrieved on Mar. 25, 2002]. Retrieved from the Internet <URL: http://www.ietf.org/rfc/rfc2138.txt>.

Rigney, C., RADIUS Accounting. RFC 2139 [online], Apr. 1997 [retrieved on Mar. 25, 2002]. Retrieved from the Internet <URL: http://www.ietf.org/rfc/rfc2139.txt>.

Postel, J., and Reynolds, J. Telnet Protocol Specification. RFC 854 [online], May 1983 [retrieved on Mar. 25, 2002]. Retrieved from the Internet <URL: http://www.ietf.org/rfc/rfc0854.txt>.

Gold Wire Technology, "Tracking Changes." In *Formulator 1.0 User Guide*, pp. 211-224.

Waldbusser, ST., et al., "Policy Based Management MIB," http://www.ietf.org/internet-drafts/draft-ietf-snmpconf-pm-05.txt, pp. 1-102.

* cited by examiner

NETWORK CONFIGURATION MANAGER

RELATED APPLICATIONS

This application claims the benefit of U.S. Provisional Application No. 60/277,669, filed on Mar. 21, 2001.

The entire teachings of the above application are incorporated herein by reference.

BACKGROUND OF THE INVENTION

A router is a device that receives data packets from one or more ports connected to one or more networks, such as local area networks (LANs) and wide area networks (WANs), and forwards the data packets through output ports selected according to each packet's destination. Based on routing tables and routing protocols, routers read the network address from each received frame and decide how to send the frame, possibly assisted by information, such as traffic load, line costs, speed, line integrity, etc., to select a most expedient route.

Core routers are the "heart" of any network. Only internal, or "core" protocols are run through these machines. No access (client) or transit lines should directly connect to these routers. Examples of core routing protocols are BGP and EGP.

Edge routers are on the perimeter of the core routers. They are responsible for properly receiving and sending traffic to and from customers, peers and transit pipes. Typical routing protocols within the edge routers are, for example, OSPF, IGRP, RIP, IS—IS and others.

Switches are network devices that filter and forward packets between network segments. Switches operate at the data link layer (layer 2) of the OSI Reference Model and therefore support any packet protocol. Networks that use switches to join segments are called "switched Networks" or, in the case of Ethernet networks, "switched Ethernet LANs."

The Internet Protocol (IP), specified in Internet Engineering Task Force (IETF) Request For Comments (RFC) 791, forms the single packet protocol which currently defines all Internet traffic and content. Destination and source addresses for all IP packets are 32-bit quantities, whose leading bytes can be used to hierarchically determine where on the Internet these addresses reside. Routers organize their own hierarchy, roughly, into a layer of routers within an Internet Service Provider (ISP) and its connected subscribers, and a layer which connects discrete ISPs. Routers on the first level of hierarchy exchange address and network reachability information amongst themselves using a class of routing protocols called Interior Gateway Protocols (IGPs).

Routers on the second level of hierarchy, connecting discrete top-level ISPs, use a different group of protocols called Exterior Gateway Protocols (EGPs).

IETF RFC 1058 defines the RIP and RIPv.2 protocols, which are IGPs, specifying a format and means for exchanging interior routing data. With RIP, routers periodically exchange entire tables. Because this is insufficient, RIP is gradually being replaced by a newer protocol called "Open Shortest Path First" (OSPF).

Border Gateway Protocol v4, or BGPv4, is an EGP that exchanges network reachability information with other BGP systems. This network reachability information includes information on the list of Autonomous Systems (ASs) that reachability information traverses. On connection start, BGP peers exchange complete copies of their routing tables, which can be quite large. However, only changes (deltas) are then exchanged, which makes long running BGP sessions more efficient than shorter ones.

There are currently thousands of network devices such as routers, switches, firewalls, servers, hubs and other network traffic processing devices on the Internet, each of which must be properly configured to deliver the desired service. Configuring a network device typically encompasses creating a "configuration file" formatted according to the manufacturer's specification. Configuration files typically have a syntax wherein some property or attribute is named, followed by values which control the behavior of the property. After a configuration file is created, it is downloaded or "pushed" to the device, which implements the configuration. Once a device is configured, however, a user can log on to the device to change one or more of the properties. Historically, these devices have been configured one at a time by operations personnel. Yet, service providers often roll out new services that are too complex and difficult to be configured manually.

The goal of network configuration management is to generate, deploy and track configurations and configuration changes for a potentially very large number of network software and hardware elements.

With traditional manual-configuration practices, the sheer volume of configuration work requires the participation of many different ISP operations personnel. Often these people use different methods and "recipes," resulting in inconsistent device configurations across the network. This in turn can lead to poor service quality and even service outages.

SUMMARY OF THE INVENTION

The present invention solves this problem by providing an automated solution for configuring and managing the configuration of the Internet infrastructure. Operations personnel can quickly execute system-wide changes that would take weeks or months using manual-configuration practices. The present invention can also detect device configuration changes under program control.

Accordingly, a network configuration management system includes a policy engine which generates configlets based on a selected target level feature set to be configured and a selected device to be configured. The configlets can be vendor-neutral, vendor-specific, or both. The selected device can be named explicitly or can be a member of a named group. A translator translates and combines the configlets to form vendor-dependent configuration files. Devices include, but are not limited to, routers, switches, firewalls, hubs, bridges, interfaces, web hosting servers, domain name system (DNS) servers and virtual interfaces.

The policy engine generates the elements of this representation, called "configlets," using policies associated with the selected target level and its sub-target levels, as defined within a configuration systems by a target level hierarchy. Target levels are, roughly, constructs for the containment of policies.

A policy includes at least a condition, and an action which the policy engine performs if the condition evaluates to a true outcome at the time of policy evaluation. In performing the action, the policy engine typically writes to at least a partial configlet. A policy may further include a verification clause, which is used to verify a running configuration.

In one embodiment, a reverse-translator produces configlets from a vendor-specific configuration file, which may have been loaded from a running network device. The verification clause then verifies the configuration.

The policy may also include documentation, such as a reason for the policy and a description of what the policy does.

Policy dependencies may also be defined such that where a second policy is dependent on a first policy, the second policy must be evaluated after the first policy. This is necessary where, for example, the first policy generates and stores a value to be used by the second policy.

In one embodiment, policies, or the policy conditions, actions, verifications, etc., are small programs written in a programming language, such as Perl, possibly with extensions to the language.

To model configlet-based configuration data, a configlet hierarchy is defined, such that a child configlet inherits from its parent properties which it does not itself define.

To enable the system to execute the policy engine relative to databases of different formats, a mapping function maps infrastructure data in a first format to a second format, such that the second format is recognizable by the policy engine. The mapping function provides the ability to read the inventory/asset database of any service provider or customers and map it to the requirements of the policy engine.

A loader loads a configuration file to its intended device. The loading can be scheduled, and batches of configurations can be scheduled together.

Another facility of the configuration management system provides a configuration archive in which both generated configurations and configurations uploaded from devices on the network can be archived.

In yet another embodiment, upon replacing a first device using a first configuration format with a second device using a second configuration format, the first device's configuration is read in or uploaded and reverse-translated into configlets. The vendor-neutral configlets are then combined and, if necessary, translated into a configuration formatted for the second device.

Furthermore, the configuration management system can act as a single secure gateway between system users and the network devices they wish to access. The configuration management system retains login names and passwords, in encrypted format, for the system itself and for the network devices. A user desiring to connect to a device must log in to the system instead. The system in turn logs in or connects to the device and passes information back and forth between the user and the device, as if the user were logged directly into the device. Thus, the password information for a protected device is not revealed to the users, but is stored by the configuration manager.

The policy-based configuration generation capabilities of the present invention enable ISPs to eliminate configuration problems when rolling out new services. Operations personnel can establish configuration policies, i.e., rules about how devices should be configured, and device configurations are automatically generated based on these policies. The present invention also allows Operations personnel to modify parts of a configuration, i.e., partial configurations, in the event that a small change is necessary.

These configurations, or partial configurations, are then deployed across the selected devices, ensuring consistent policy enforcement and, as a result, maximum service quality. An embodiment of the present invention also performs verification and reporting to validate that the configurations of deployed devices conform to the desired policies.

Operations departments often need to make routine updates to many devices at one time. This manual procedure is time-consuming, tedious and error prone. With the present invention, an operator can perform routine updates to thousands of devices with a single command. These capabilities enable service providers to roll out and maintain services quickly and efficiently, improving customer satisfaction, customer retention and ultimately, improving revenue streams.

To ensure that the desired configurations are maintained over the long term, network operators need strong auditing capabilities so they can track all of the changes made to each device. The present invention provides comprehensive auditing that automatically logs all sessions and provides information such as who has accessed the device, what changes were made, when it happened and why. The present invention keeps an archive of all configurations, enabling operations personnel to restore configurations if a new configuration becomes undesirable.

The present invention eases the administration of access control to devices and reduces security risks by providing a centralized point for device password control. This is important because many operations people need to access routers and other devices, which can make controlling access problematic. The present invention also eliminates the need to distribute device passwords to operators, which reduces potential security breaches in an age of high employee turnover.

The present invention is built on a highly scalable architecture that can accommodate the continued explosive growth of the Internet. It scales to support networks with thousands of devices, automated operations and large number of users. It automates routine operations and supports multiple vendors, devices and image versions. This enables Internet Service Providers (ISPs) to lower operational costs by automating device configuration changes across large multi-vendor networks, removing the need to set up device-specific operations.

Current manual-device configuration practices are reaching the end of their useful life. Without an automated configuration solution, ISPs will face increasing delays and obstacles in the deployment of new services. In a worse case scenario, manual-configuration practices can make service on the Internet so unpredictable that its value to society will decline.

By enabling the smooth rollout of new devices and services, the present invention plays a critical role in the Internet's continued evolution. The configuration roadblock is removed, thus clearing the way for service providers to roll out new, enhanced services that will enable the Internet to deliver on its promise as a world-changing information infrastructure.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 14 is a tree diagram illustrating a subset of a sample configlet schema according to an embodiment of the present invention.

DETAILED DESCRIPTION OF THE INVENTION

Figure 1:
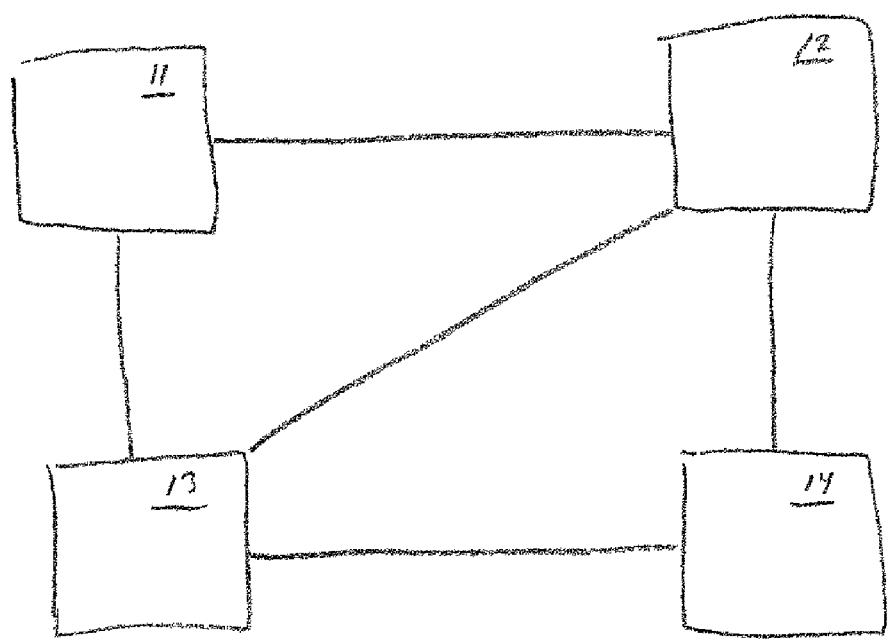
FIG. 1 is a schematic diagram illustrating a simple core network of a service provider.

FIG. 1 is a schematic diagram illustrating a simple core network 10 of a service provider. While a real core network typically has hundreds or even thousands of network devices, in this simple example, there are four multiply-connected routers 11–14, which may be geographically located apart from each other.

The information paths between the routers are called routes, and as is apparent from FIG. 1, not all routers in the core network need be directly connected. For example, for routers 11 and 14 to communicate, they must do so through either router 12 or 13, or some other path not shown.

Figure 2:
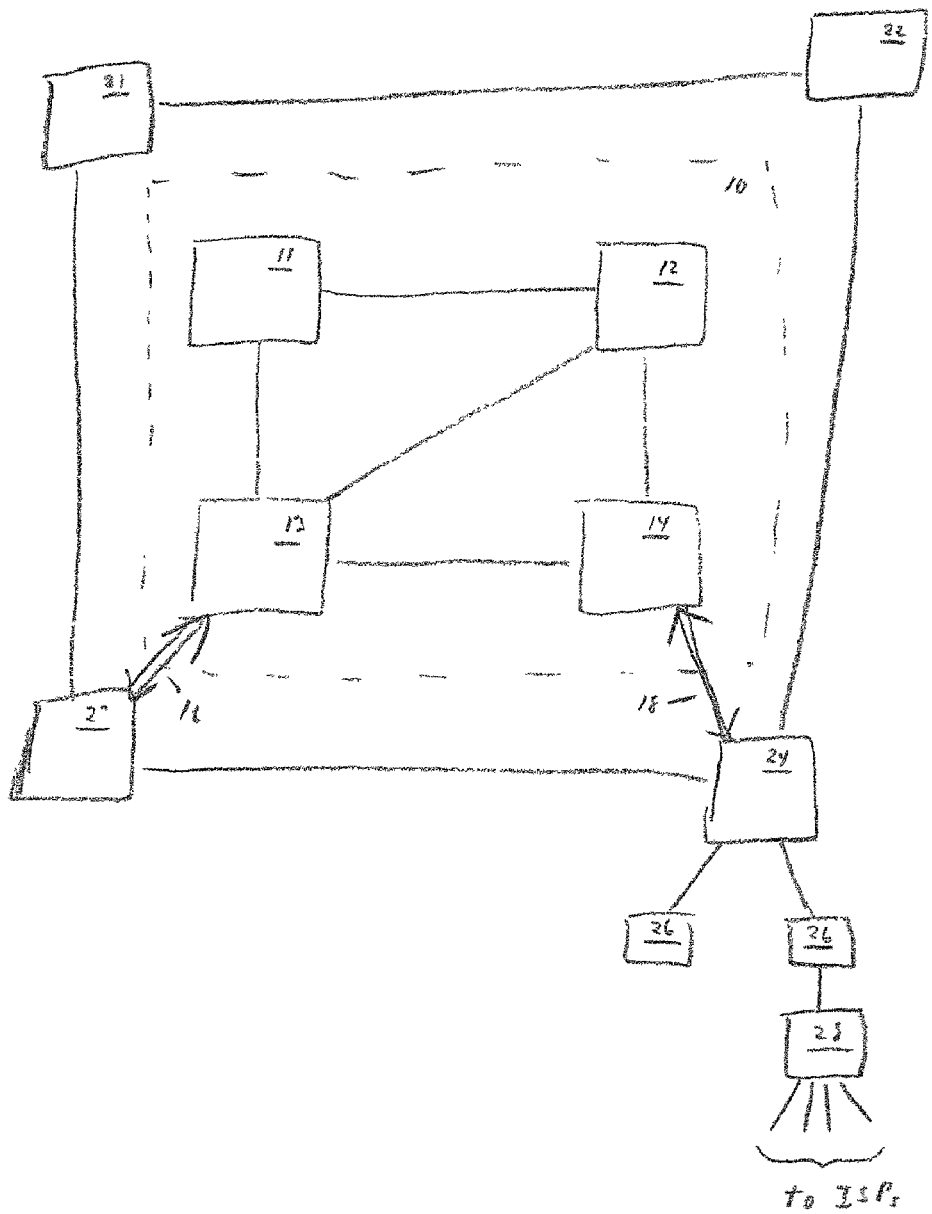
FIG. 2 is a schematic diagram illustrating the interconnection between two core networks, each belonging to a separate service provider.

FIG. 2 is a schematic diagram illustrating the interconnection between two core networks, each belonging to a separate service provider. Routers 21–24 belong to a second service provider while routers 11–14 belong to the first service provider's core network 10 from FIG. 1.

Note that routers 13 and 23 communicate directly over path 16 and that routers 14 and 24 communicate directly over path 18. Paths 16 and 18 are called peering points. Peering points are the connections between various core networks. The Internet comprises hundreds or thousands of interconnected core networks.

Also shown in FIG. 2, connected to router 24 are distribution routers 26, which are connected to points of presence (POPs) 28, which in turn may provide Internet access to Internet Service Providers (ISPs).

Various protocols are used at different points within the Internet. For example, OSPF and RIP are used between routers within an autonomous system (AS), i.e., a network system such as a core network controlled by a single entity. BGP4 is used between routers of different ASs.

Figure 3:
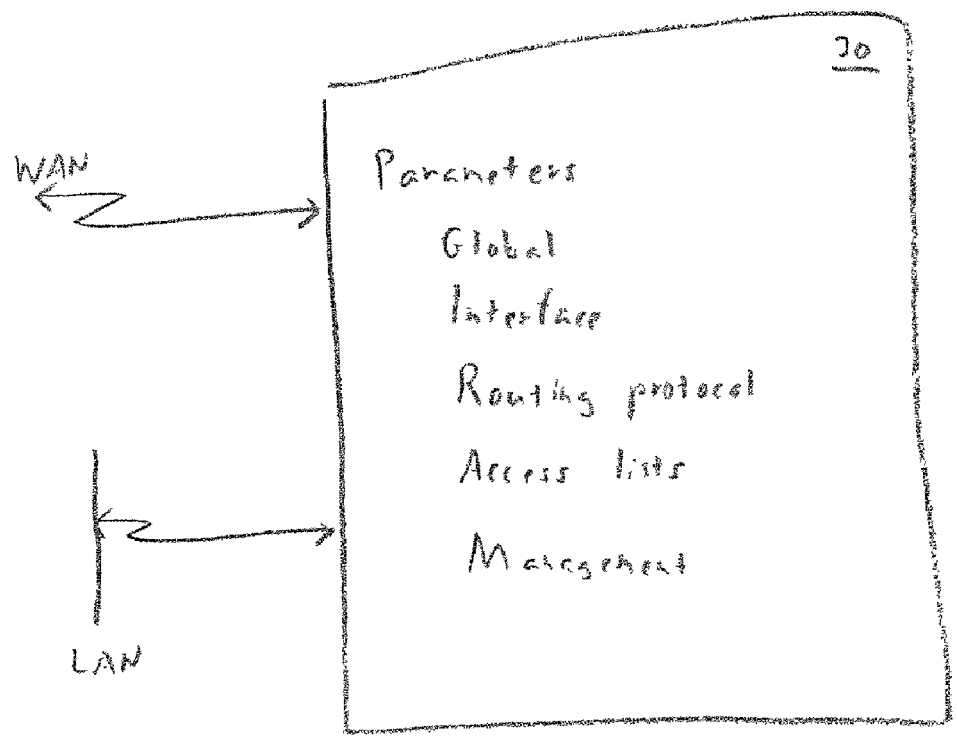
FIG. 3 is a schematic diagram illustrating sample types configuration parameters of a router.

As FIG. 3 illustrates, a router 30 (or another network device such as a bridge or a switch) has many parameters which must be configured to provide the desired service. Such parameters may include, for example, global parameters such as hostname, telnet and encryption parameters; interface parameters such as one or more addresses and address types, and peering arrangements; routing protocols; access lists; and management parameters such as user names and passwords, SNMP configuration, etc. To obtain particular behavior, these parameters must be set to particular values, or configured.

Figure 4:
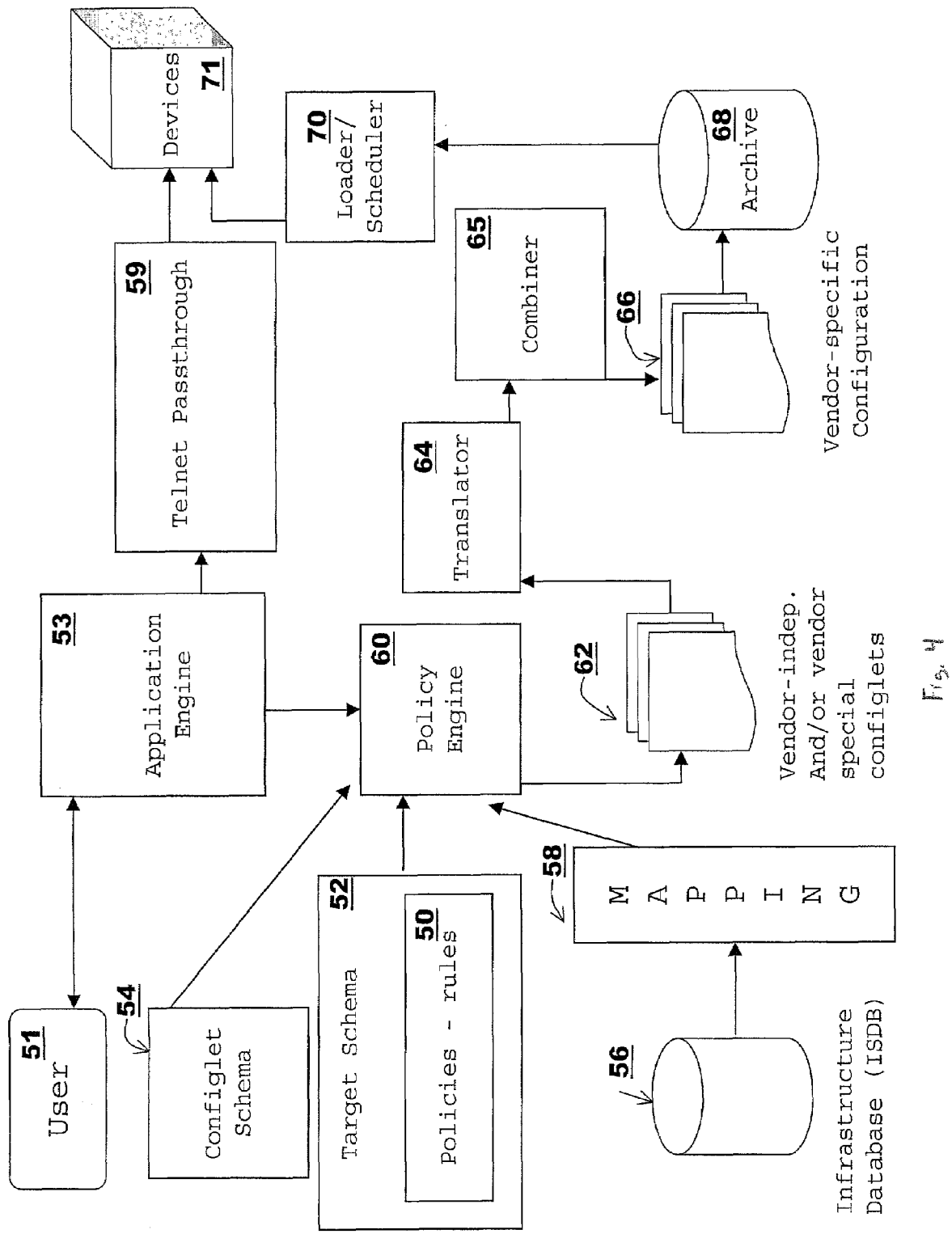
FIG. 4 is a schematic diagram of an embodiment of the present invention.

FIG. 4 is a schematic diagram illustrating an embodiment of the present invention. A user 51 invokes and interacts with an application engine 53. The application engine, in turn, invokes a policy engine 60. The application engine 53 can also invoke a telnet passthrough facility 59, which allows the user 51 to access network devices 71 as if there were a direct connection.

The policy engine 60 assembles one or more partial configurations called "configlets," based on a set of policies 50, a target level schema 52 and a configlet schema 54, each of which is discussed in more detail below. The policies 50 are applied to a selected device or device group, a description of which resides in an infrastructure database (ISDB) 56. The data within the ISDB may be legacy data, or for other reasons may be in some particular format. Rather than forcing the conversion of this data, the present invention provides a mapping function 58 which maps the ISDB data to a format which the policy engine 60 can use.

The infrastructure database 56 stores information such as different models of equipment, e.g., Cisco 2500, cards that go into the equipment, and specific equipment instances.

Configlets 62 may be vendor-neutral, vendor-specific or both. A translator 64 translates the vendor-neutral portions of the configlets 62 to vendor-specific formats, and a combiner 65 combines the configlets to generate, for the selected network device or device group, vendor-specific configurations 66, i.e., configurations which can be loaded onto and understood by the devices. These configurations can be stored in a configuration archive 68, from which they can be immediately loaded into the devices 71 or scheduled for later downloading by a loader/scheduler 70.

Some activity can be automated by creating batch jobs that are scheduled to run at a later time or on a regular basis. In addition, existing jobs can be viewed and deleted. In one embodiment, the job scheduler 70 polls every ten minutes by default for jobs to run. The frequency at which the job scheduler polls for jobs can be changed.

Figure 5:
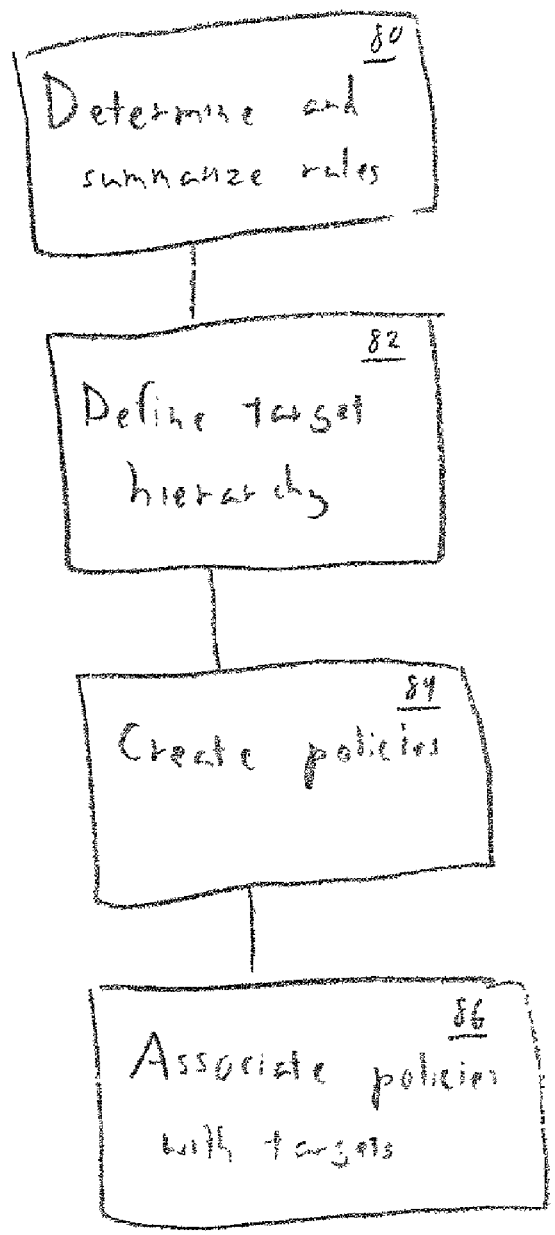
FIG. 5 is a flowchart illustrating the policy-based configuration management system of an embodiment of the present invention.

As FIG. 5 illustrates, the policy-based configuration management system of an embodiment of the present invention follows four major steps. First, the rules used to generate configurations are determined and summarized by an administrator (step 80). Second, a target level schema or hierarchy 52 (FIG. 4) is defined (step 82). Third, policies 50 (FIG. 4) containing the rules used to generate configurations are created (step 84). Finally, the policies are associated with target levels (step 86).

Of course, one skilled in the art would recognize that the particular order of steps shown is not the only order possible. For example, policies could be created before defining the target level hierarchy.

The process of summarizing the rules used to generate configurations includes defining the things for which a configuration is to be generated, such as devices, device parameters, and services; and defining the commonalities among these. This process leads to a determination of policies and target instances that are needed.

A device configuration file 66 (FIG. 4) is generally an ASCII text file containing a set of instructions that specify the behavior of a device in a network. For example, a device configuration file may specify which network protocols are supported, or which wide area network (WAN) protocols will be run on each interface. It could also be a textual representation of a binary configuration file or a set of lower level instructions, e.g., SNMP commands.

The maintenance and growth of a network requires moves, changes and additions of devices and services. Each of these requires changing device configurations, and the process of changing configurations requires management.

One way to manage configurations is through policy-based configuration management. Policy-based configuration management allows the articulation of rules to generate configurations independent of which specific devices are covered by the criteria for the rule's application. A rule is first determined such as, "all BGP routing devices on your network in the Northeast region use the same Autonomous System." This rule is then implemented in a policy.

Policy-based configuration management ensures that these rules are applied to generate configurations for the devices that meet the defined criteria, regardless of the equipment manufacturer.

Figure 6:
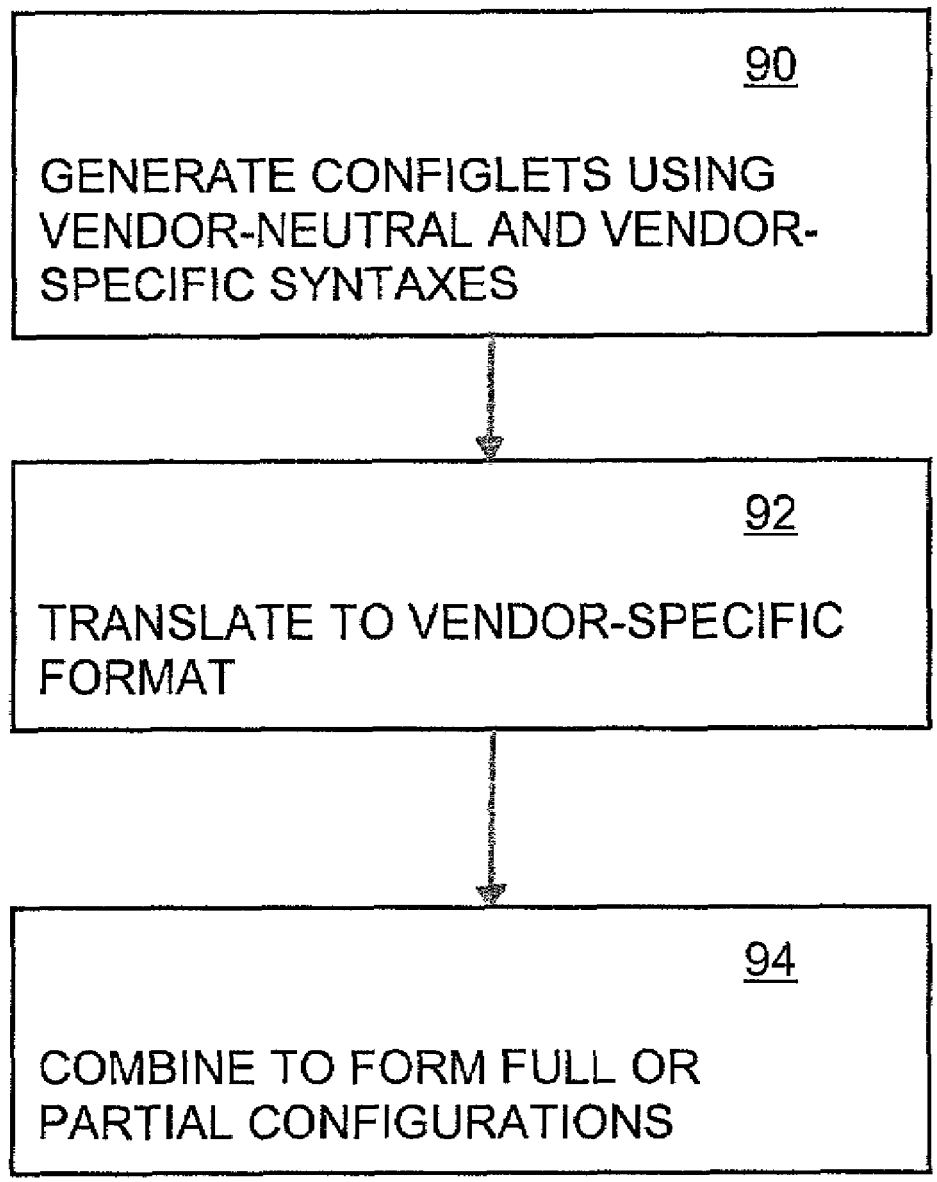
FIG. 6 is a flowchart illustrating the three main processes of the policy-based configuration management of an embodiment of the present invention.

As the flowchart of FIG. 6 illustrates, the policy-based configuration management of an embodiment of the present invention splits the generation of configurations into three major steps. First, in step 90, the configuration is described in configlets in an abstract format, using a combination of vendor-neutral and vendor-specific syntaxes. In step 92, vendor-neutral syntax is translated into vendor-specific syntax. Finally, in step 94, configlets are combined to form full or partial configurations that can be loaded into their intended network devices. Alternatively, configlets could be combined first and vendor-neutral syntax translated after.

Targets

"Target levels" are created as a means of organizing a device's related configurable elements into groups such as BGP, interfaces, security, etc., according to the specific ISP configuration discipline. Target levels also allow the grouping of policies that configure these elements. As target levels are defined, they are placed into the target level hierarchy 52 (FIG. 4).

An embodiment of the present invention uses target levels to determine the relevant policies required to generate a configuration, and the target level schema to determine the order for executing these policies. Based on the target level selected by the user, either a complete or partial configuration is generated for the device or device group. This provides the flexibility to generate only the specific portions of a configuration that are needed.

Target instances represent the things for which configurations are generated. Target instances include devices, device parameters and services. The target level schema, like a directory structure, specifies a hierarchy amongst related target instances.

To generate or verify a configuration, some network device or group of devices is selected. A target level is then selected, from the target level hierarchy, that specifies the part of the configuration to be generated and/or verified. The target level hierarchy indicates to the policy engine which other target levels must also be included, if any, based on the selected target level. In one embodiment, to begin configuration generation, the user issues a request to the network configuration manager, naming the selected device or device group, and the selected target level.

Figure 7:
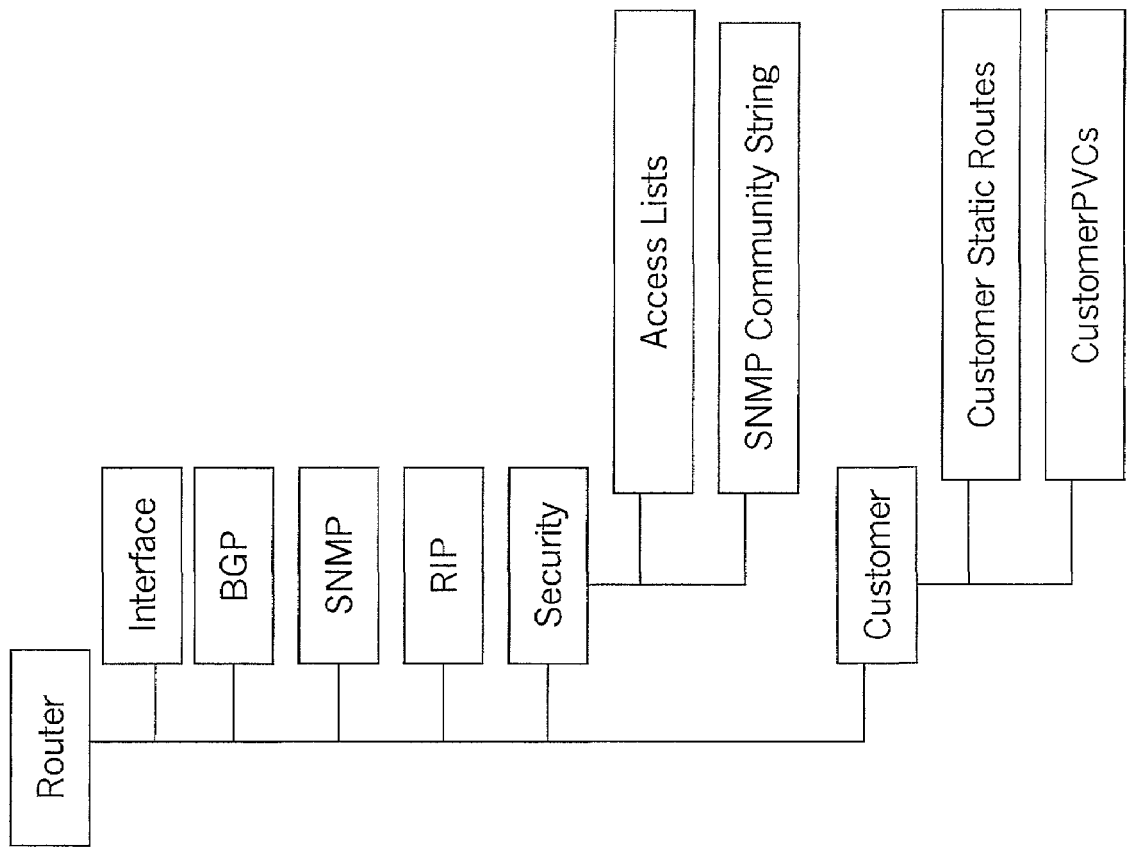
FIG. 7 is a tree diagram illustrating a sample target level hierarchy of an embodiment of the present invention.

FIG. 7 is a tree diagram illustrating a sample target level hierarchy 52. "Router" is the highest target level in the tree shown, although other target levels at the same hierarchical level could include bridges, switches, etc. Selecting the "router" target level will create a full router configuration. There are six sub-target levels: Interface; BGP; SNMP; RIP; Security; and Customer. Selecting any of these sub-target levels will cause the generation of a partial configuration which will pertain only to the selected sub-target level and its sub-target levels, if any. Note that this example includes two coexisting types of target levels: those such as SNMP and RIP that are driven by a technology or protocol; and those such as "Customer" and "Security" that are driven by specific customer requirements.

Note also that the "Security" and "Customer" sub-target levels each have two sub-target levels: "Access List" and "SNMP Community String" under the "Security" target level; and "Customer Static Routes" and "CustomerPVCs" under the "Customer" target level.

When a target level is selected, the policy engine knows, from the target level schema, that the configuration also needs to include the selected target level's sub-target levels.

Thus, target levels enable the generation of both complete and partial configurations. The amount of configuration that the policy engine generates depends upon the target level's position in the target level schema hierarchy. If a target level at the top of the hierarchy is selected, then the policy engine generates a configuration for all of the sub-target levels beneath it. If a target level in the middle of the hierarchy is selected, the policy engine describes configuration just for that target level, and for that target level's sub-target levels, if any.

Although the example of FIG. 7 illustrates only a two-level hierarchy, it would be understood by one skilled in the art that the present invention could employ multiple hierarchical levels.

Figure 8:
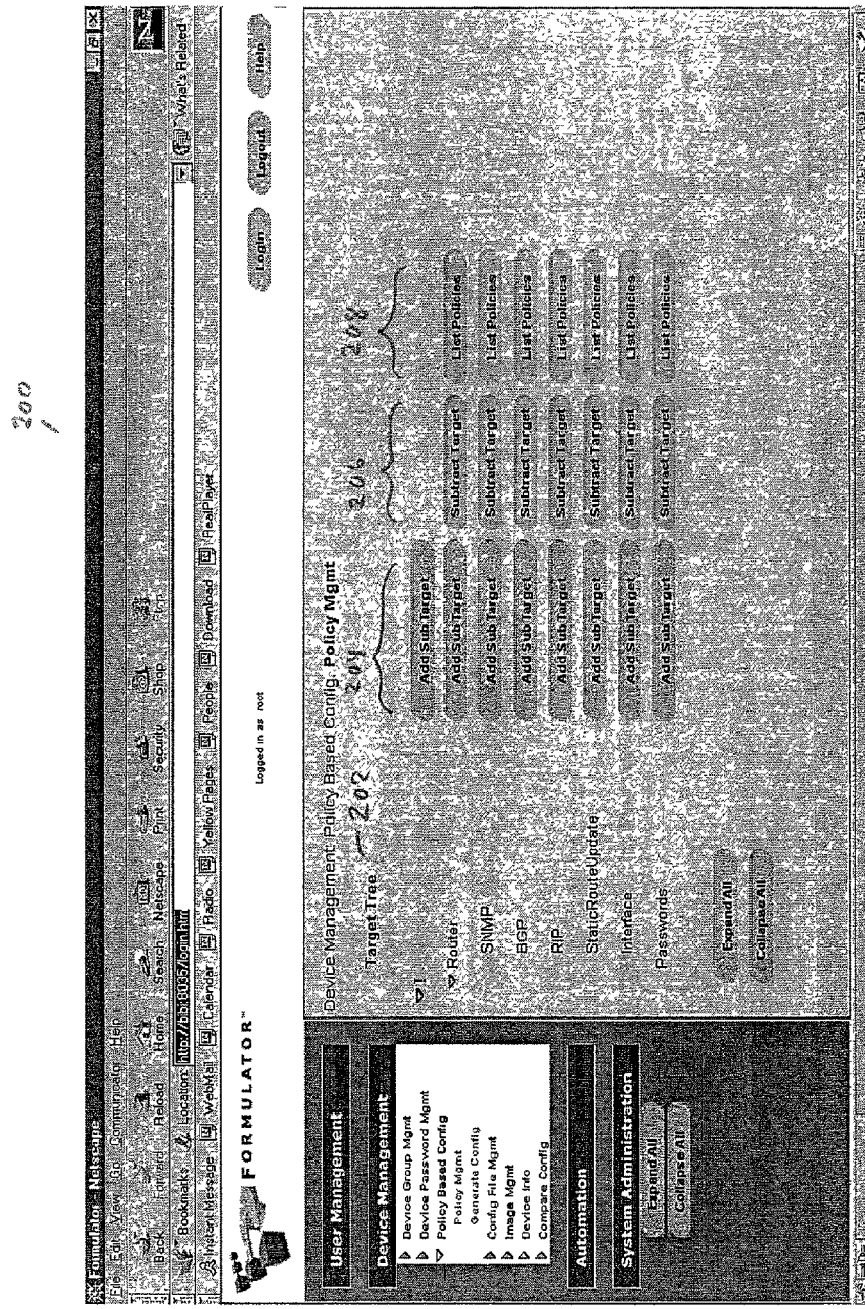
FIG. 8 is a computer screen of an embodiment of the present invention from which a user can view the target level hierarchy, add and delete subtarget levels, and list the policies associated with each target/subtarget level.

FIG. 8 illustrates a window screen 200 which allows a user, via an ordinary Web-type browser, to view the target level hierarchy, add and delete subtarget levels, and list the policies associated with each target/subtarget level.

The target level tree or schema is represented at 202. Next to each target level is an "Add Sub Target" button 204 which can be used to add sub-target levels to the respective target level. Similarly, "Subtract Target" buttons 206 are available for every target level in the schema, except for the root target level (!), which cannot be deleted. Finally, each target level except for the root target level has a "List Policies" button 208 with which a user can view, add, edit or delete policies associated with the respective target level.

In addition to having a parent, each target level can be associated with an "instance group" and an "instance rule." A target level's instance group acts as a filter, defining a specific group of devices that the particular target level is permitted to configure. Devices which are not part of a target level's instance group, or interfaces on devices which are not part of a target level's instance group, will not be configured by the target level's policies. A target level's instance rule is a directive that configurations are to be generated only for those configuration elements, e.g., devices, cards, interfaces, lines or POPs, specified by the instance rule. That is, only these specified elements are conveyed to policies for configuration generation.

Policies

A policy is a rule or set of rules used to determine certain configuration parameter values to be pushed to network elements. For example, a basic policy might be: "All routers in the network are to have Interface Serial1 active." A slightly more complex policy might be: "All routers in the network are to have Interface Serial1 active except for 140.239.245.50, which will have Interface Serial0 active."

Policies are used to manage configurations. Policies specify, in a device-independent and/or device-dependent fashion, configuration content. Within each policy, rules are specified for creating some portion of a configuration. Policies can be used both to generate device configurations and to verify running configurations by comparing them to configurations generated from policies and archived configurations.

A policy of the present invention includes conditions, actions and verification criteria. When generating a configuration for a device or device group, the policy engine 60 determines which policies to use to generate the configuration, based upon the target level selected by the user, by selecting policies which have been associated with the selected target level and its sub-target levels.

Figure 9:
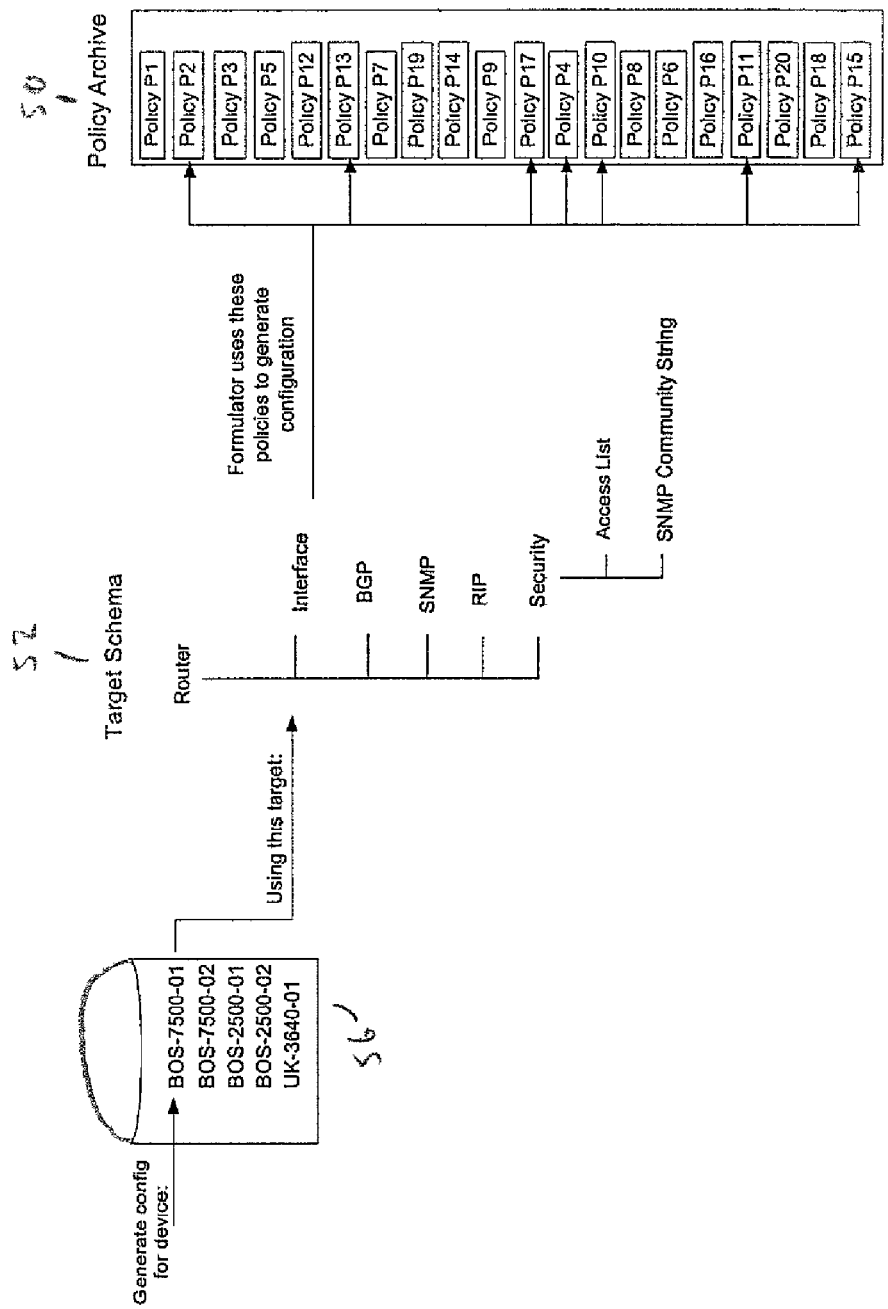
FIG. 9 is a schematic diagram illustrating the selection of policies according to an embodiment of the present invention.

FIG. 9 illustrates the selection of policies. First, a device or device group listed in the ISDB 56 and for which a configuration is to be generated is selected. Here, a device identified as "BOS-7500-01" is selected. Next a target level is selected. Here, the target level "Router:Interface" is selected. The routing engine finds and evaluates all of the policies from the policy archive 50 which are associated with the "Router:Interface" target level. In this example, these are policies P2, P13, P17, P4, P10, P11 and P15.

For any given configuration that a policy generates, specific values may need to be included. A policy gets the data it needs from the target instance for which it is generating a configuration.

Each policy contains one or more query statements for obtaining information from the infrastructure database 56 (FIG. 4) about the device or devices to be configured. This query statement indicates which data the policy needs.

When a target level and device or devices are selected, the target level obtains from the ISDB 56, all of the data for the specified device or devices. The policies in turn access the data they need to specify instructions for the configuration from the target level.

In an embodiment of the present invention, policies are discrete routines that generate formatted descriptions of the instructions needed to configure a device, its behavior, or a business service to be provided over a network.

Multiple policies may be used to generate a configlet, which in turn may encompass multiple attributes. For example, several policies may be used to describe various attributes of an interface and to ultimately describe the complete set of instructions required to configure interfaces. The policy author determines the granularity of the configuration any given policy generates.

Figure 10:
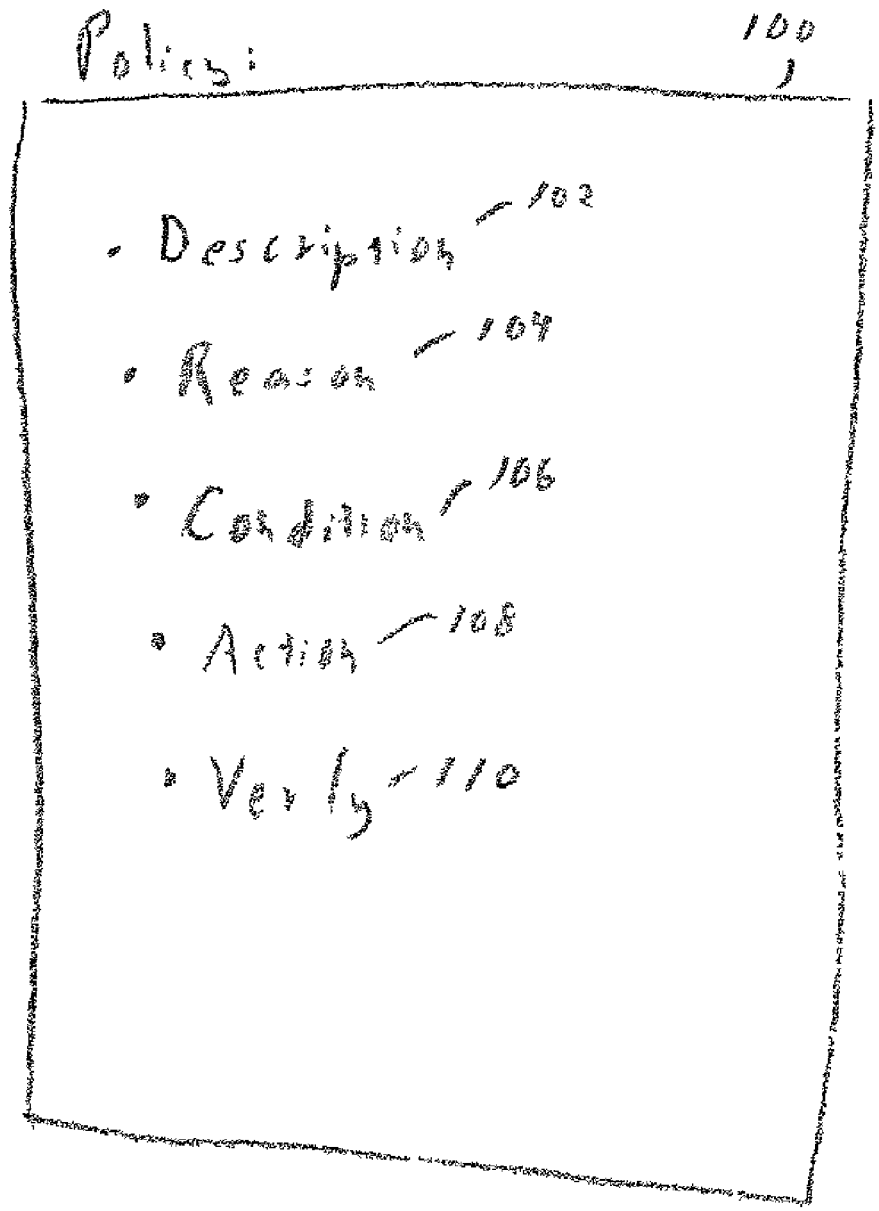
FIG. 10 is a schematic diagram illustrating the various parts of a policy, according to an embodiment of the present invention.

As FIG. 10 illustrates, in an embodiment of the present invention, a policy 100 contains a description 102, a reason 104, a condition 106, an action 108 and a verify element 110.

The description 102 provides a detailed description of what the policy 100 does. The reason 104 is a brief description explaining why the policy 100 is necessary. Thus the description 102 and reason 104 together serve as documentation for the policy 100.

The condition statement 106 allows the policy engine to determine whether it needs to evaluate this particular policy to generate a configuration. The condition 106 is a statement that is either true or false. If true, the policy engine evaluates this policy 100. If false, the policy engine does not evaluate this policy.

The action 108 contains commands that create configlets. These commands are executed when the condition 106 is true.

The verify element 110 serves two purposes. First, it is used by the policy engine during a "verify configuration" operation to determine whether discrepancies exist between a configuration and this policy. Second, it is used by the policy engine to resolve the situation where two policies try to set the same property to different values.

The policy author can specify whether a discrepancy discovered during the verify process is serious enough for the policy engine to generate an alert, and if so, the severity level of the alert that the policy engine generates.

To pass data between policies, a temporary shared storage space called a "whiteboard" is used. This is useful, for example, if an address must be calculated for several related policies. By using the whiteboard, the address need only be calculated once. The result can be made visible for access by the other policies.

Figure 11:
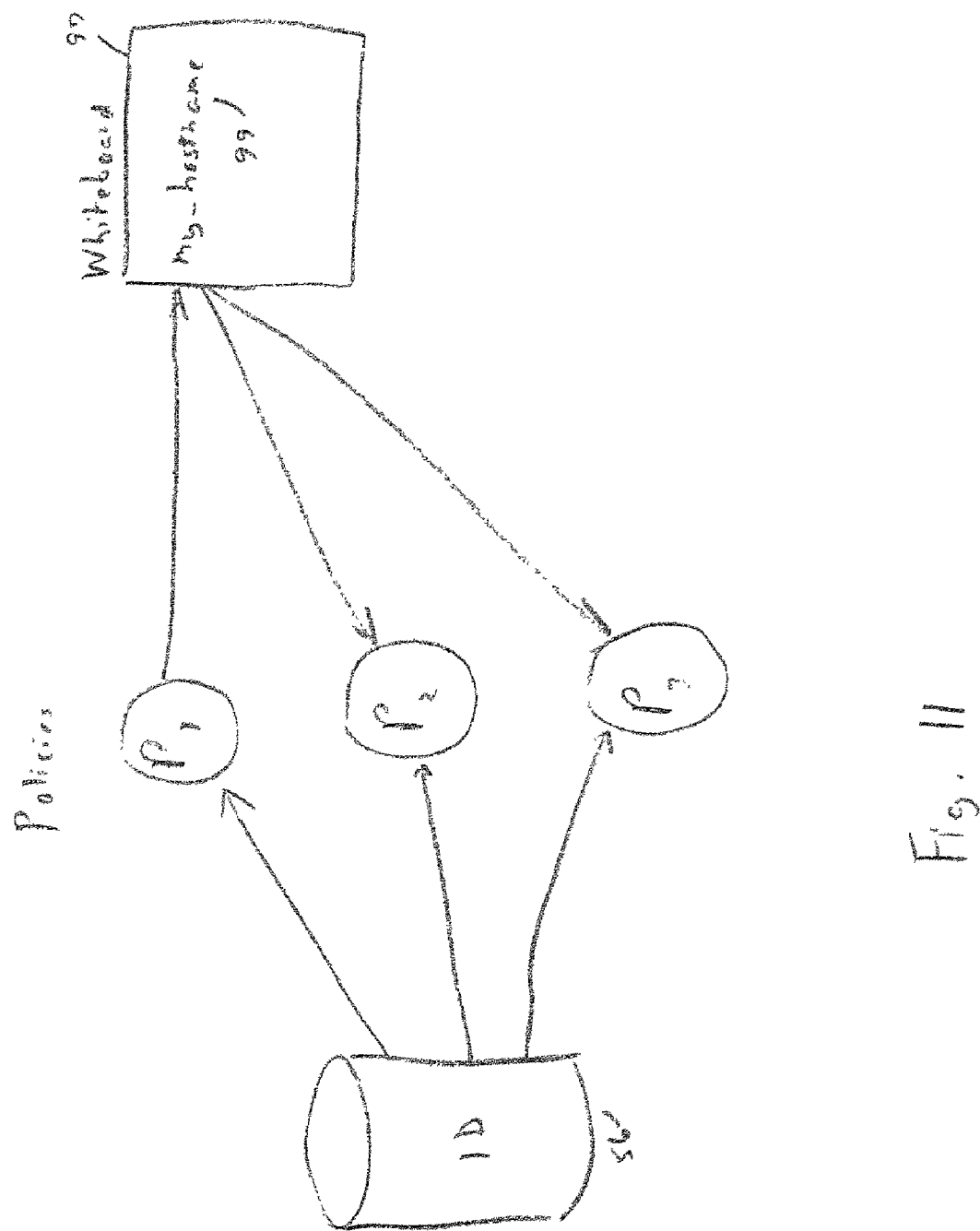
FIG. 11 is a schematic diagram illustrating the whiteboard feature of an embodiment of the present invention.

FIG. 11 illustrates use of the whiteboard 97. In this example, three policies $P_1$, $P_2$ and $P_3$ are being used to generate a configuration. Each access the infrastructure database 56 to obtain various data. However, these accesses are costly with respect to resources. Here, all three policies need the hostname "my_hostname" 99. Since policy $P_1$ is the first to retrieve the value, policy $P_1$ stores the value "my_hostname" 99 in the whiteboard 97. The two policies $P_2$ and $P_3$ are then able to read the value 99 directly from the whiteboard 97 rather than having to access the database 56 again. Of course, this requires that dependencies be set up such that policies $P_2$ and $P_3$ are dependent on $P_1$.

Generating Configurations

Figure 12:
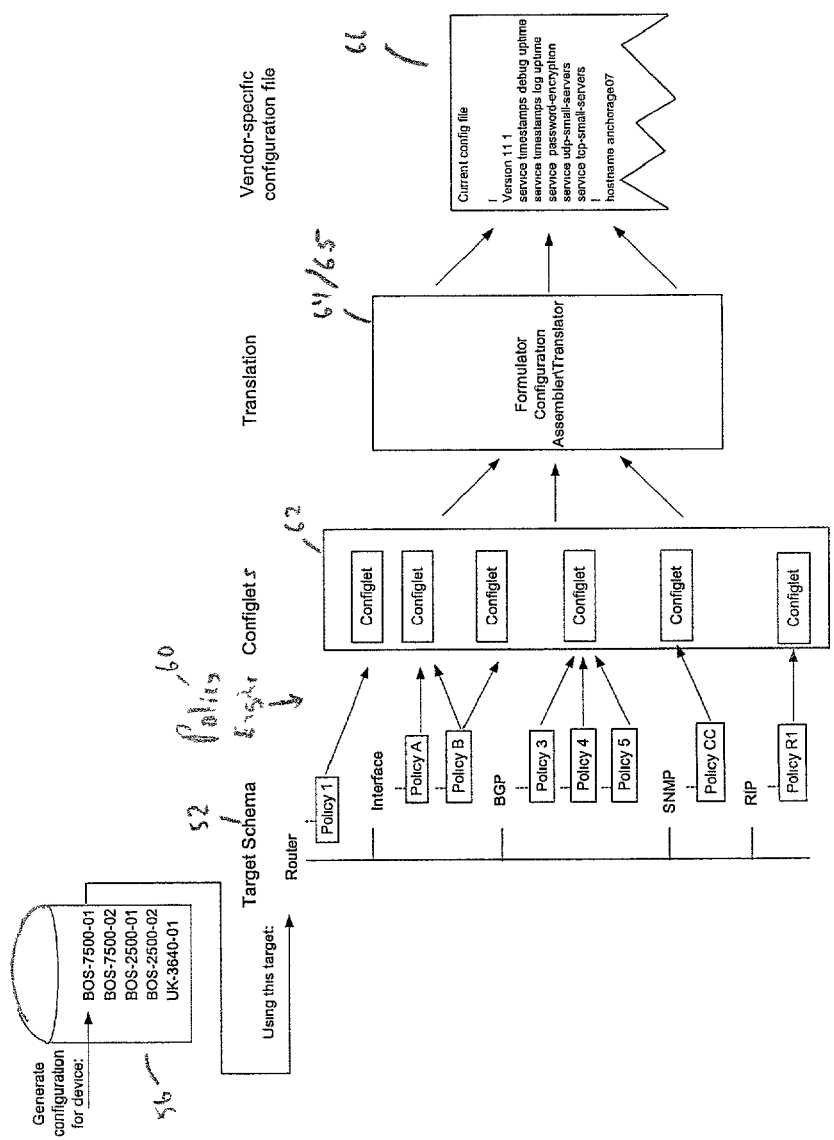
FIG. 12 is a schematic diagram illustrating the generation of configlets according to an embodiment of the present invention.

As shown in FIG. 12, when the policy engine evaluates a policy, it generates all or a portion of a small, independent data structure called a configlet that contains the results of the policy. Here, the user has selected the "Router" target level. Thus, policies associated with the "Router" target level and with each sub-target level of the "Router" target level are evaluated by the policy engine 60, resulting in the generation of several configlets 62.

Each configlet describes the attributes and properties for some aspect of the selected device or service. The policy engine 60 may add the results of one or more policies to a single configlet to complete the attributes that a single configlet describes.

The policy engine then passes the configlets 62 to the translator/combiner 64/65. The translator/combiner 64/65 converts and combines the configlets 62 into a configuration 66 with the appropriate vendor-specific format for the device.

Policies are written as small programs in a scripted programming language such as Perl,. In one embodiment, the policy engine uses an embedded version of a Perl interpreter to evaluate policy rules. This embedded version of Perl contains both basic Perl functions and Perl extensions created explicitly for writing policy rules.

Figure 13:
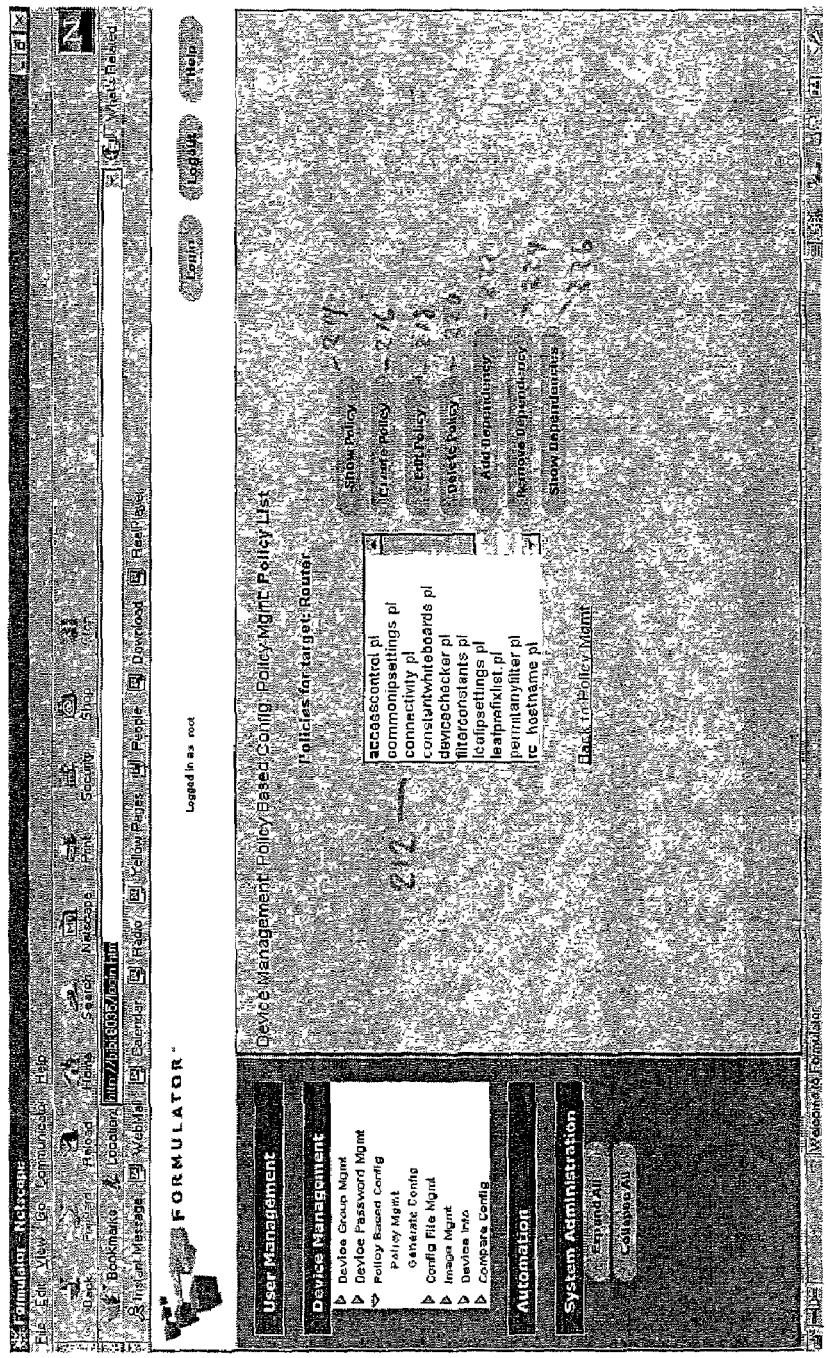
FIG. 13 is a computer screen which is displayed when the "List policies" button of FIG. 8 is selected.
Figure 11:
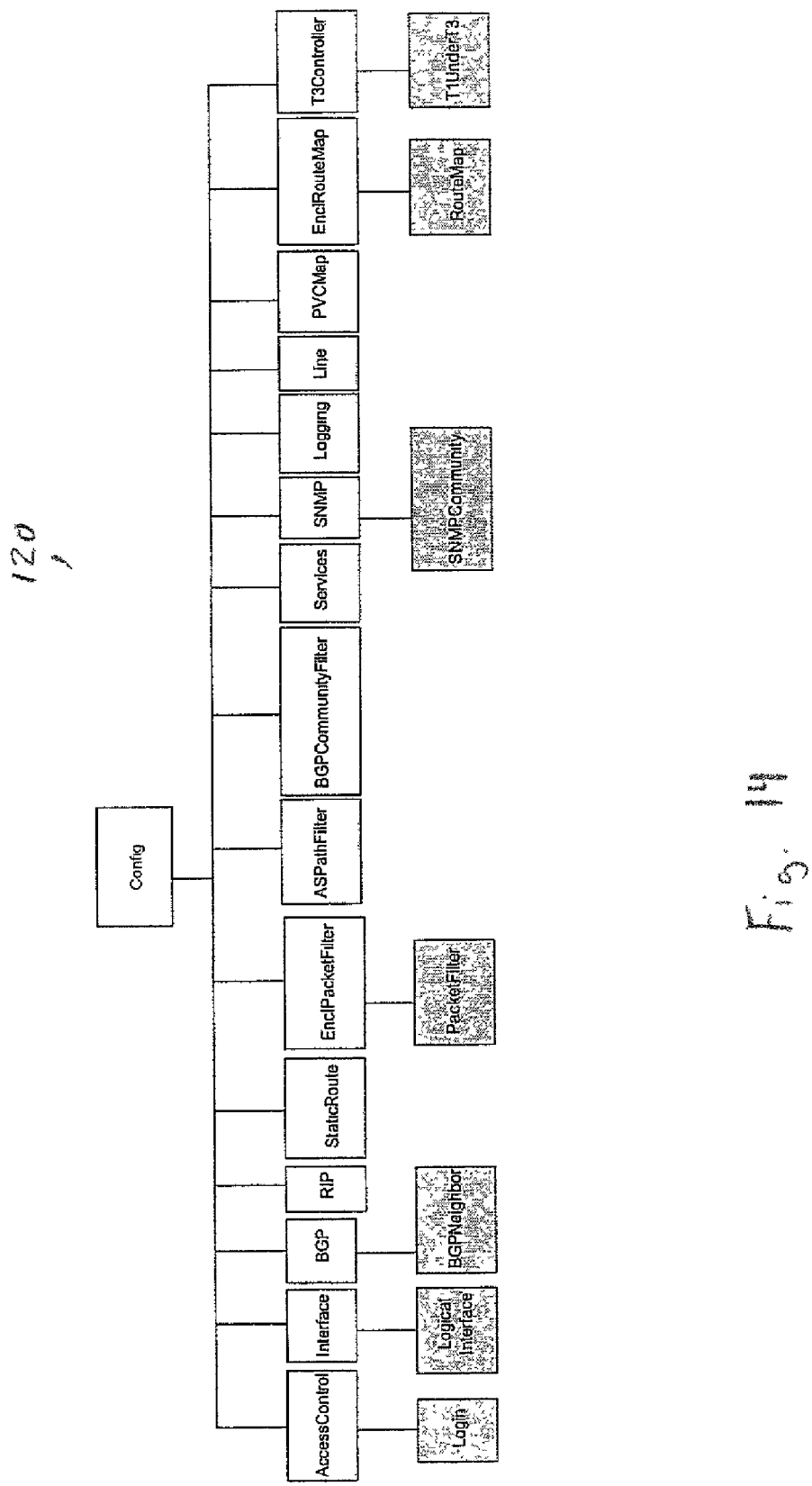

FIG. 13 illustrates a window that is displayed when the "List policies" button 208 of FIG. 8 is selected. Scrolling pane 212 lists all policies for the target level selected in FIG. 8. To view a specific policy, the user selects the policy and clicks on the "Show Policy" button 214. To create a policy, the user clicks on the "Create Policy" button 216. To edit or delete an existing policy, the user selects the policy and clicks on the "Edit Policy" button 218 or "Delete Policy" button 220 respectively.

Similarly, policy dependencies can be added, removed or viewed via the "Add Dependency" button 222, the "Remove Dependency" button 224 or the "Show Dependencies" button 226 respectively.

With dependencies, a user can specify that one policy is dependent on another policy. Such a dependency indicates to the policy engine that it must evaluate one policy before evaluating another one. Dependencies are essential in some cases, such as where one policy sets up a context that another policy requires or references, using, for example, the whiteboard.

Configlets

As described above, the policy engine evaluates the policies and puts the results into data structures called "configlets." Configlets are in an intermediary format that the policy engine uses to organize the pieces of a configuration prior to translation into a vendor-specific format. A configlet can be thought of as a container of related name/value pairs and vendor-specific content (referred to as "verbatims").

An embodiment of the present invention defines a hierarchical relationship, or "configlet schema," among configlets. FIG. 14 illustrates a sample configlet schema 120.

Each type of configlet represents some protocol or service and contains the configlet properties generated by policy-rules for the protocol or service that each type of configlet represents.

The configlet schema defines the organization by which the various types of configlets are linked to each other through parent-child relationships.

In some cases a parent and child configlet may be of the same type. For example, a Logical Interface configlet can be a child of another Logical Interface configlet. In the case of a parent and child configlet being of the same type, the parent is considered an enclosing default configlet. This means that if any of the parent's same configlet type children does not have a certain property that the parent (enclosing default) does, then the child inherits the property as if it had that property itself. If both the child and the parent have the same property, the child keeps its own value for that property and does not inherit the property from its parent.

Configlet properties represent the supported attributes that you can specify for a protocol or service in a configuration. Attributes that are not supported can be set for auto-generation using "verbatim" extensions in the policy-rule. With verbatim extensions, the exact syntax of the desired attribute is specified and the policy engine includes that syntax in the generated configuration. Verbatim extensions specify raw configuration data, and thus, use vendor-specific data.

Passthrough

In an embodiment of the present invention, device passwords must be added, exactly as configured on the devices, to the ISDB. The device passwords are stored in encrypted format, and used to authenticate users to the devices when users telnet to the devices through the present invention's telnet passthrough.

Figure 15:
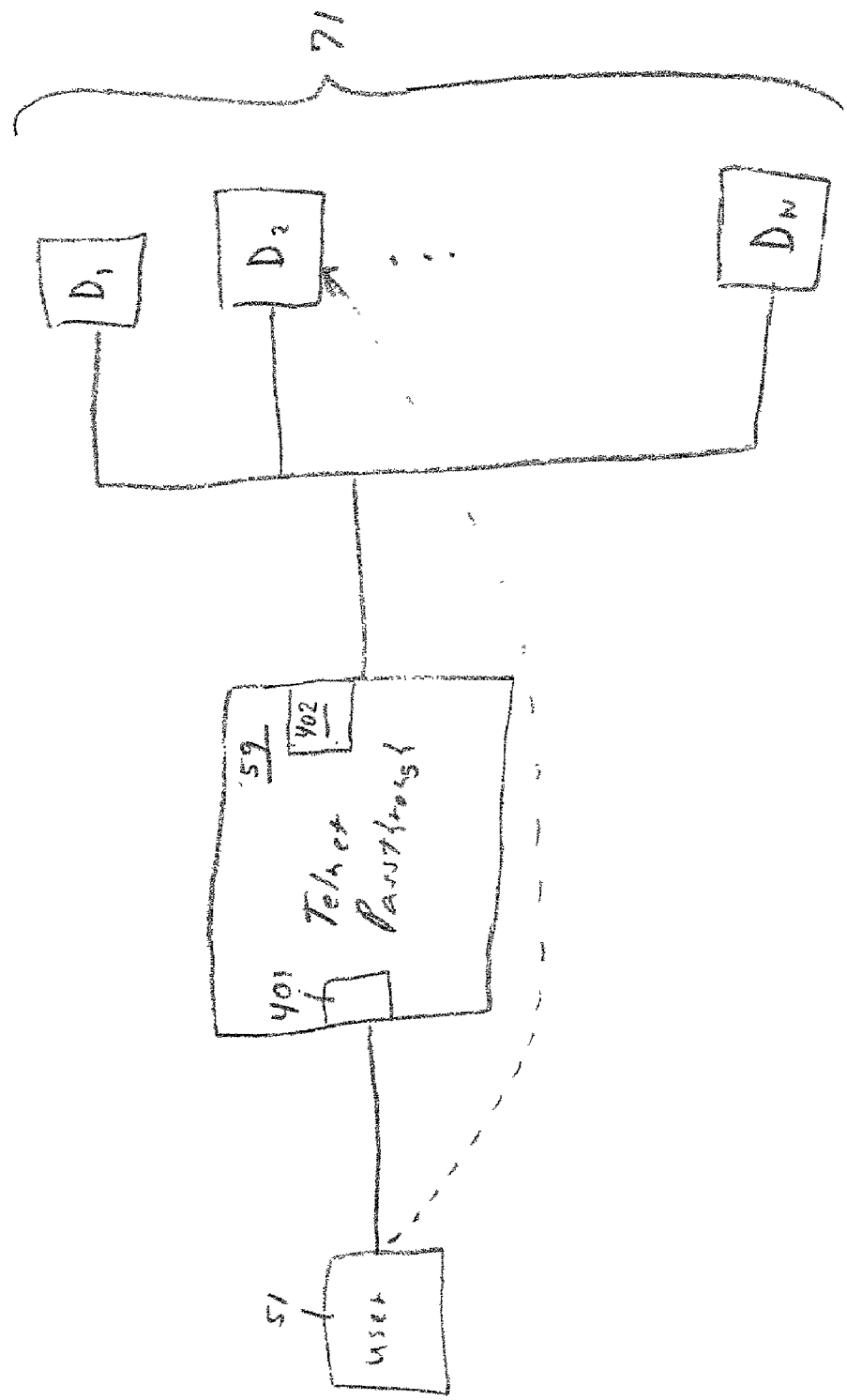
FIG. 15 is a schematic diagram illustrating the pass-through feature of an embodiment of the present invention.

FIG. 15 provides an illustration. The telnet passthrough facility 59 of the present invention provides an interface 401, such as a telnet interface or a Web interface, through which a user 51 logs in. The telnet passthrough facility 59 maintains a list 402 of encrypted login names and passwords for a plurality of devices 71 such as devices $D_1$–$D_N$, as well as an access list describing which users are authorized to access a particular device. The user indicates which device he wishes to communicate with, in this example, device $D_2$. The telnet passthrough facility 59 finds the login name and password for device $D_2$, logs on to that device, and proceeds to pass information back and forth between the user 51 and device $D_2$, providing the user 51 with a sense of a direct connection to the device.

Because the device logins and passwords are encrypted and presumably unknown to users, users must communicate with the devices 405 through the telnet passthrough facility 59. This enables the application engine 53 (FIG. 4) to monitor or audit and log any configuration changes prompted by the user 51, and also allows the application engine 53, through the telnet passthrough facility 59, to control access to a particular device.

Example Policy

The following is a policy written in accordance with an embodiment of the present invention, for illustrative purposes. This policy creates interface configlets and sets the IP address.

Note that the condition always returns the value 1, i.e., true, so that the corresponding action is always performed.

At step 1 of the action, the Perl extension Formulator::CreateConfiglet( ) creates an "Interface"-type configlet named "ether0" for the target instance passed in with the arguments. The second call to Formulator::CreateConfiglet( ) creates a child configlet of type "LogicalInterface" with the first configlet as the parent.

At step 2, the IP address and mask are extracted from the infrastructure database for the given target instance.

In step 3, if the IP address and mask are not blank, they are used to set certain properties of the LogicalInterface configlet.

```
# Rule #1: SetupInterfaces
# This policy rule creates interface configlets.
# It also sets the IP address and
# tells the verify routine to ignore "extra" interfaces.
sub Reason
{
```

-continued

```
        my ($me) = @_;
        return "Someone has to setup the interfaces";
}
sub Description
{
        my ($me) = @_;
        return "Create an interface configlet. Use the target object to extract".
                "the IP address from the database. Set the configlet's IP address".
                "Finally, don't flag extra interfaces as errors (at least for now).";
}
sub Condition
{
        my ($me, $target) = @_;
        # In this case, we always want to be called for an interface.
        return 1;
}
sub Action
{
        my ($me, $target) = @_; # this means they're passed in as parameters
        my $configletRef, $1ConfigletRef;
        my $ipAddress;
        my $mask;
        my $broadcastIpAddr;
        my $message;
        #Step 1 -- create an interface configlet.
        $configletRef = Formulator::CreateConfiglet("Interface", $target, 0, "ether0");
        $1ConfigletRef = Formulator::CreateConfiglet("LogicalInterface", $target,
                        $configletRef, "ether0");
        #Step 2 -- now extract interface address and mask
        $ipAddress = $target->Data( )->{"IPADDRESS"};
        $mask = $target->Data( )->{"NETMASK"};
        #Step 3 -- if the address or mask is blank, terminate here
        if (! ($mask && $ipAddress))
        {
                $msg = "IP Address or mask missing in database--serious interface".
                        "data problem";
                Formulator::WriteErrorMessage($msg);
        }
        else
        {
                # Set properties
                $1ConfigletRef->SetProperty("ipaddress", $ipAddress);
                # This is a "helper" function in our "macro" file (policyentry.pl)...
                # doesn't need the "Formulator::" qualification.
                $broadcastIpAddr = ::BroadcastAddress($ipAddr, $mask);
                $1ConfigletRef->SetProperty("broadcast-address", $broadcastIpAddr);
        }
}
sub Verify
{
        my ($me, $errorObject) = @_;
        # Because of the AddPolicyForVerification call, the verify routine
        # can be called under a wide variety of cases. First determine if we should
        # even bother looking at the error.
        # If the configlet associated with this error is something other than an interface,
        # don't bother.
        if ($errorObject->GetConfiglet( )->GetConfigletType( ) == "interface")
        {
                return;
        }
        # If the extra object is an interface, ignore the error.
        if ($errorObject->GetErrorType( ) eq "EXTRA_CONFIGLET")
        {
                $errorObject->IgnoreThisError( );
                return;
        }
        # If the IP address or mask is different or missing, its a severe error.
        if (($errorObject->GetPropertyName( ) eq "ipAddress") ||
                        ($errorObject->GetPropertyName( ) eq "mask"))
        {
                $errorObject->AddErrorMessage("SEVERE",
                        "The address and mask must be consistent".
                        "with the values in the ISDB");
        }
}
```

Figure 16:
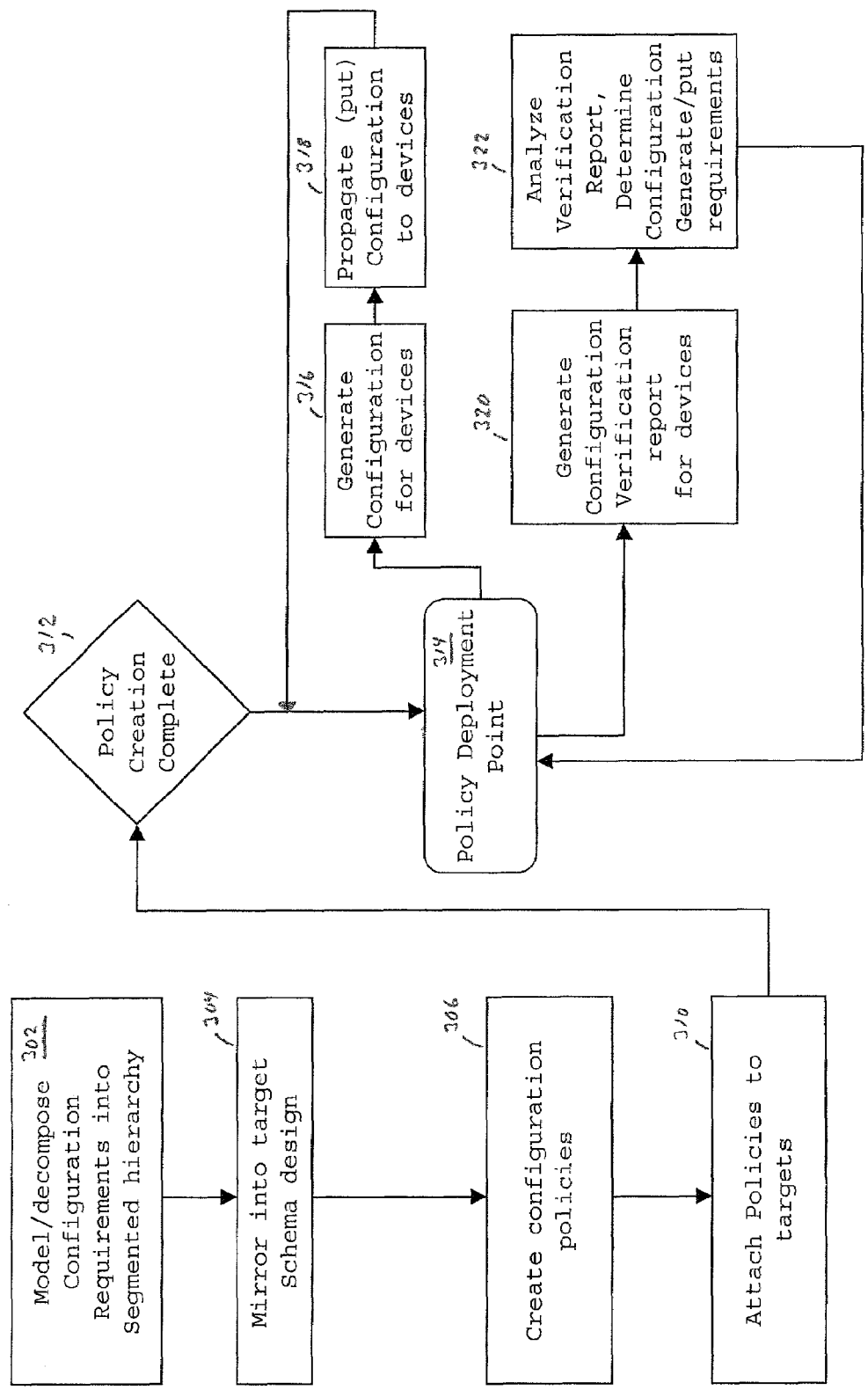
FIG. 16 is a flowchart illustrating the configuration policy creation and deployment process of an embodiment of the present invention.

FIG. 16 illustrates the configuration policy creation and deployment process of an embodiment of the present invention.

In step 302, configuration requirements are modeled or decomposed into a segmented hierarchy. The present invention allows the decomposition of a configuration with respect to areas that are likely to need higher frequency "partial" regeneration and refresh to a device, as well as areas that are likely to require iterations over sub-target levels.

In step 304, as a result of the analysis of step 302, a target level schema is created for the user's network. The target level schema at this point is simply a hierarchical containment structure for network policy. No configuration policies actually exist yet.

In step 306, policies are created which, when executed, will create or write to vendor-independent configlets.

In step 310, policies are attached to, or associated with, target levels.

At step 312, policy creation is complete. That is, the editing, organizing, and creating of policy is complete.

Step 314, the policy deployment point, is an "idle" state with respect to the deployment of the policy content. There are two paths from which such deployment can be initiated, depending on what the user wishes to do. Each path returns to step 314 after completion.

In step 316, configurations are generated for one or more devices via a complete evaluation of the policy content, relative to the target level schema. Such evaluation is done via hierarchical traversal with respect to the target level schema. Note that the output of step 316 comprises the vendor-specific configurations for the devices for which policy evaluation was successful. The actual devices are not configured in this step.

In step 318, the generated configurations are propagated to the intended devices.

On the other major path, in step 320, a configuration verification report is generated for the selected devices.

Figure 17:
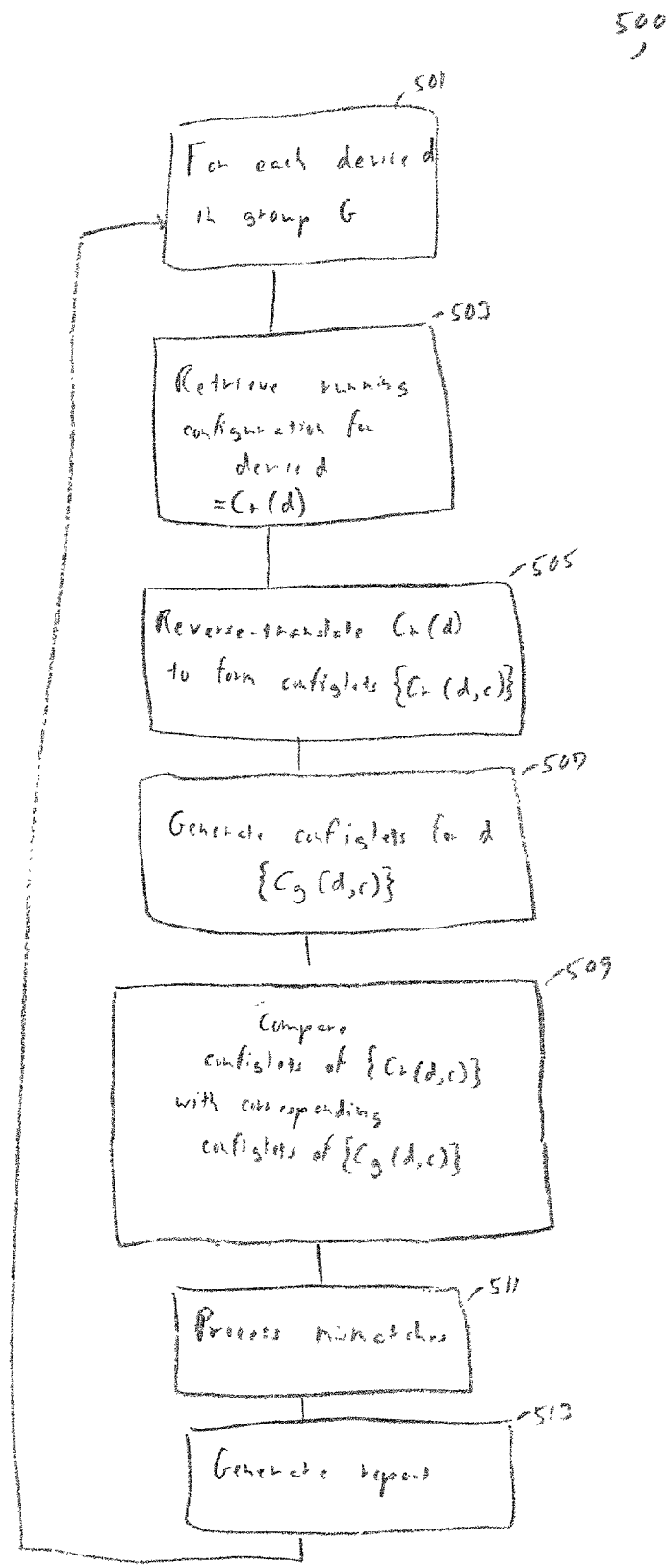
FIG. 17 is a flowchart which describes the verification process of FIG. 16.

FIG. 17 is a flowchart 500 which describes the verification process of step 320 (FIG. 16).

As step 501 illustrates, the process is repeated for each device d in group G for which verification has been requested.

First, in step 503, a running configuration Cr(d) for device d is retrieved. In step 505, the retrieved configuration Cr(d) is reverse-translated to its configlet-based representations, the set of which is notated as {Cg(d,c)}.

Next, in step 507, a configuration generation is initiated for device d. This configuration generation proceeds only until the creation of the configlet-based representation for the configuration, that is, until the set of configlets {Cg(d,c)} has been produced. In step 509, corresponding configlets from the two sets {Cg(d,c)} and {Cr(d,c)} are compared.

In step 511, the results of mismatches from this comparison (step 509) can be processed or ignored by verify clauses in each policy invoked in the "forward" creation of {Cg(d,c)} and the "reverse" creation of {Cr(d,c)}. Finally, a report is generated detailing variations between {Cg(d,c)} and {Cr(d,c)} (step 513).

Referring again to FIG. 16, in step 322, the verification report is analyzed, and configuration generation and deployment requirements are determined in response to the report.

One of the reasons for generating a verification report is to allow a user or administrator to determine the existence and degree of deviation between the business logic which the policies express, and the configurations which are present on the devices themselves.

In response to the reported deviations, a user may take various actions, such as, for example, generating a new configuration to address a configuration inconsistency on one or more devices, or modifying policies.

In a further embodiment of the present invention, if a network device made by a first vendor is replaced with a network device made by a second vendor, before replacing the first router, its configuration can be read in and reverse translated into configlets. Upon installing the second network device, a new configuration file can be generated based on these configlets. Thus, with very little user intervention, the present invention can place a configuration on the new network device which is equivalent to the configuration that was on the first network device.

Figure 18:
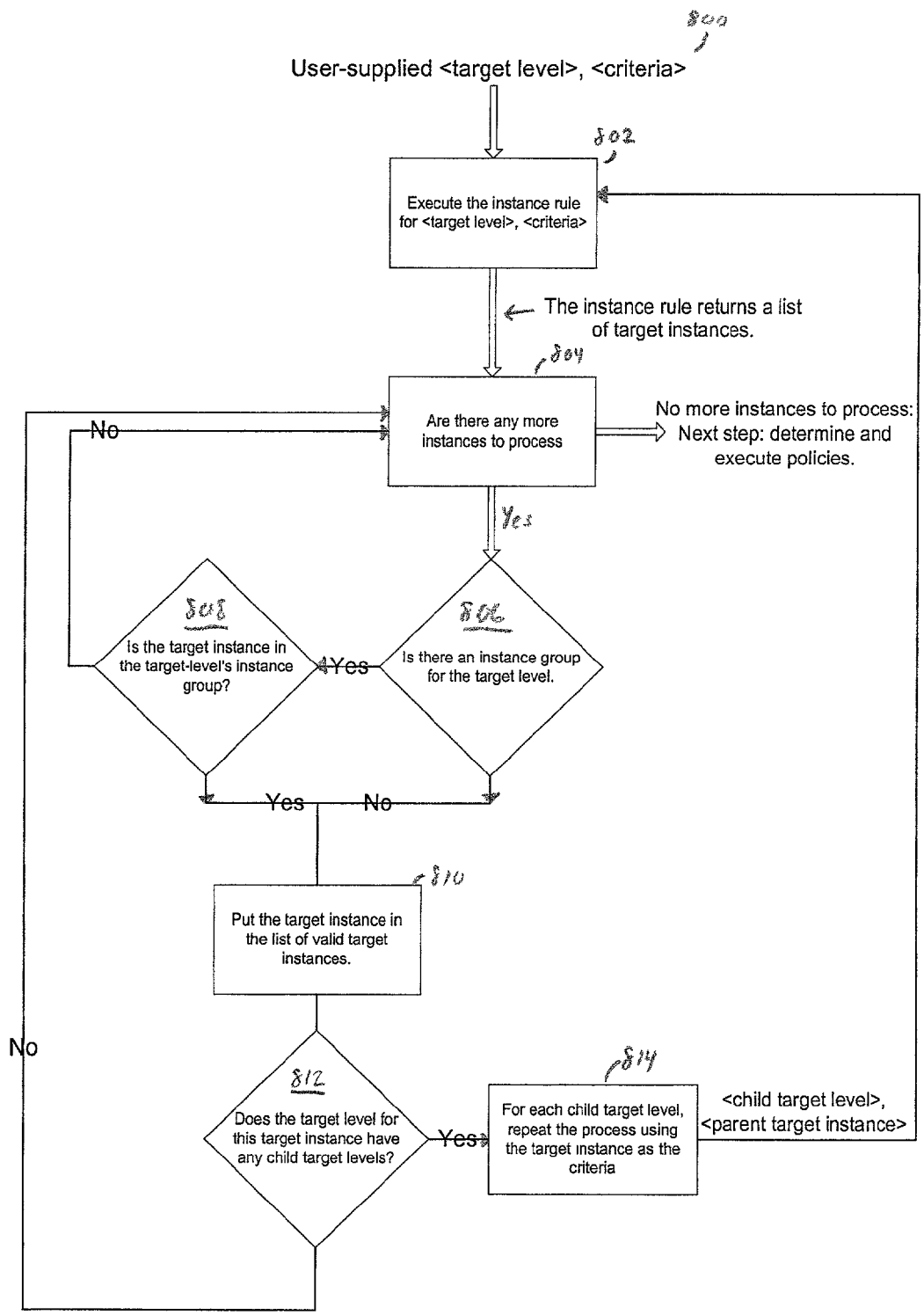
FIG. 18 is a flowchart showing the determination of target-instances according to an embodiment of the present invention.

FIG. 18 is a flowchart showing the determination of target instances according to an embodiment of the present invention.

First, at 800, the user supplies the configuration manager with a target level and some criteria. At step 802, the instance rule for the selected target level is executed. The instance rule returns a list of target instances. Target instances are typically the network devices themselves, but can be anything for which a configuration is to be generated.

At step 804, if there are any target instances to process, control proceeds to step 806, which determines whether there is an instance group for the target level. If there is, then at step 808 it is determined whether the target instance is in the instance group of the selected target level. If the target instance is not in the instance group, it is ignored, and the next target instance from the list is examined at step 804.

If, on the other hand, either there is no instance group for the selected target level (step 806), or the target instance is in the target level's instance group (step 808), the target instance is put into a list of valid target instances (step 810).

If, at step 812, it is determined that the target level for the target instance does not have any child or sub-target levels, the process is repeated from step 804 for any additional instances to process. Otherwise, from step 814, the process starting at step 802 is repeated for each child target level, using the target instance as the criteria.

Figure 19:
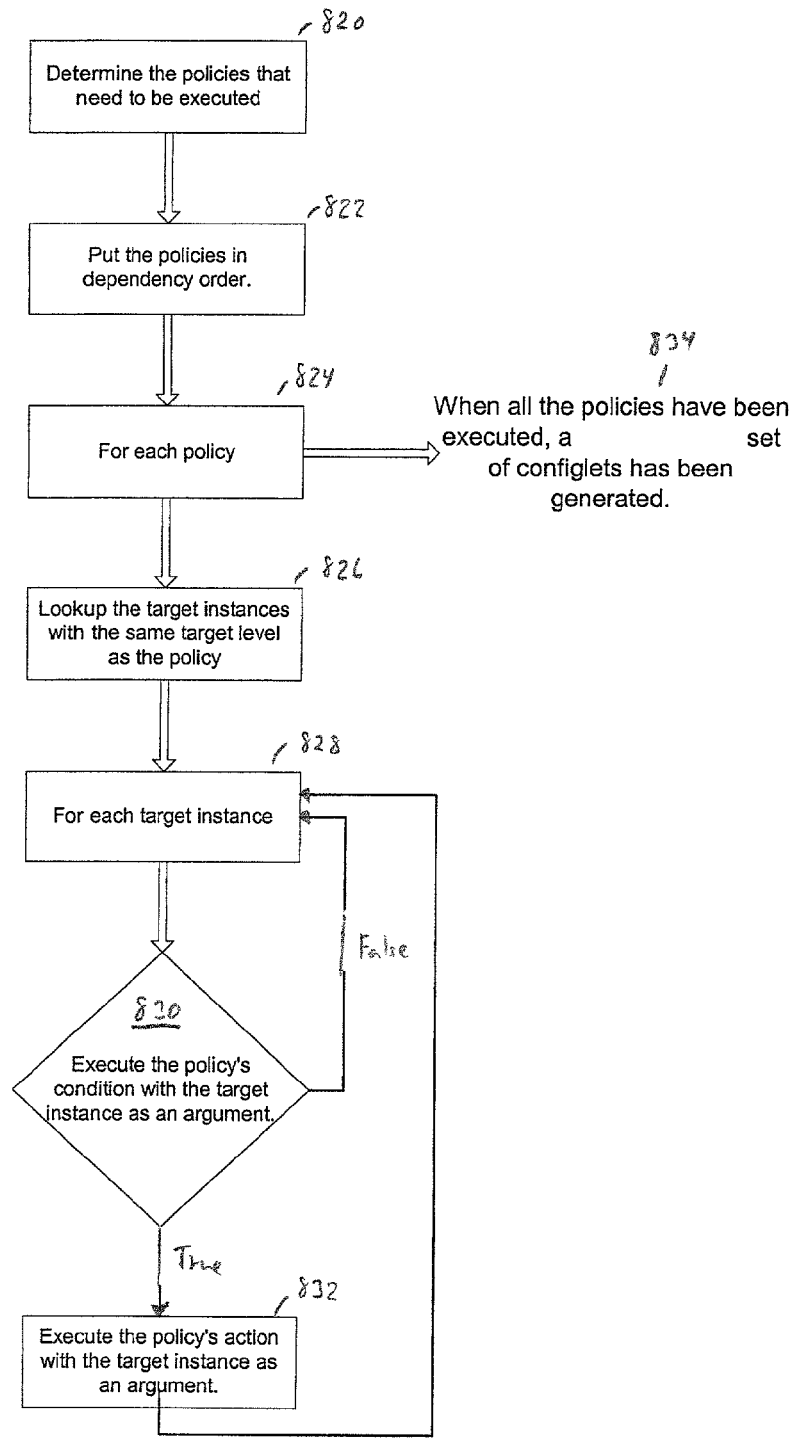
FIG. 19 is a flowchart showing the execution of policies for the target-instances of FIG. 18.

When finally there are no more instances to process at step 804, the policies to be executed are determined and executed, as detailed in FIG. 19.

FIG. 19 is a flowchart showing the execution of policies for the valid target-instances determined in FIG. 18.

In step 820, a determination is made as to which policies are needed for execution, based on the selected target level and its subtarget levels. In step 822, the policies are reordered according to their dependencies, if any.

Steps 824 through 832 are performed for each policy.

At step 826, the target instances with the same target level as the policy are referenced. Beginning at step 828, for each target instance, the condition of the policy selected in step 824 is executed with the target instance as an argument (step 830). If the condition returns "false," the next target instance is examined in step 828. On the other hand, if the condition returns "true," then the policy's action is executed with the target instance as an argument (step 832).

When all policies have been executed (step 834), a set of configlets has been generated.

Example of Configuration Generation

Figure 20:
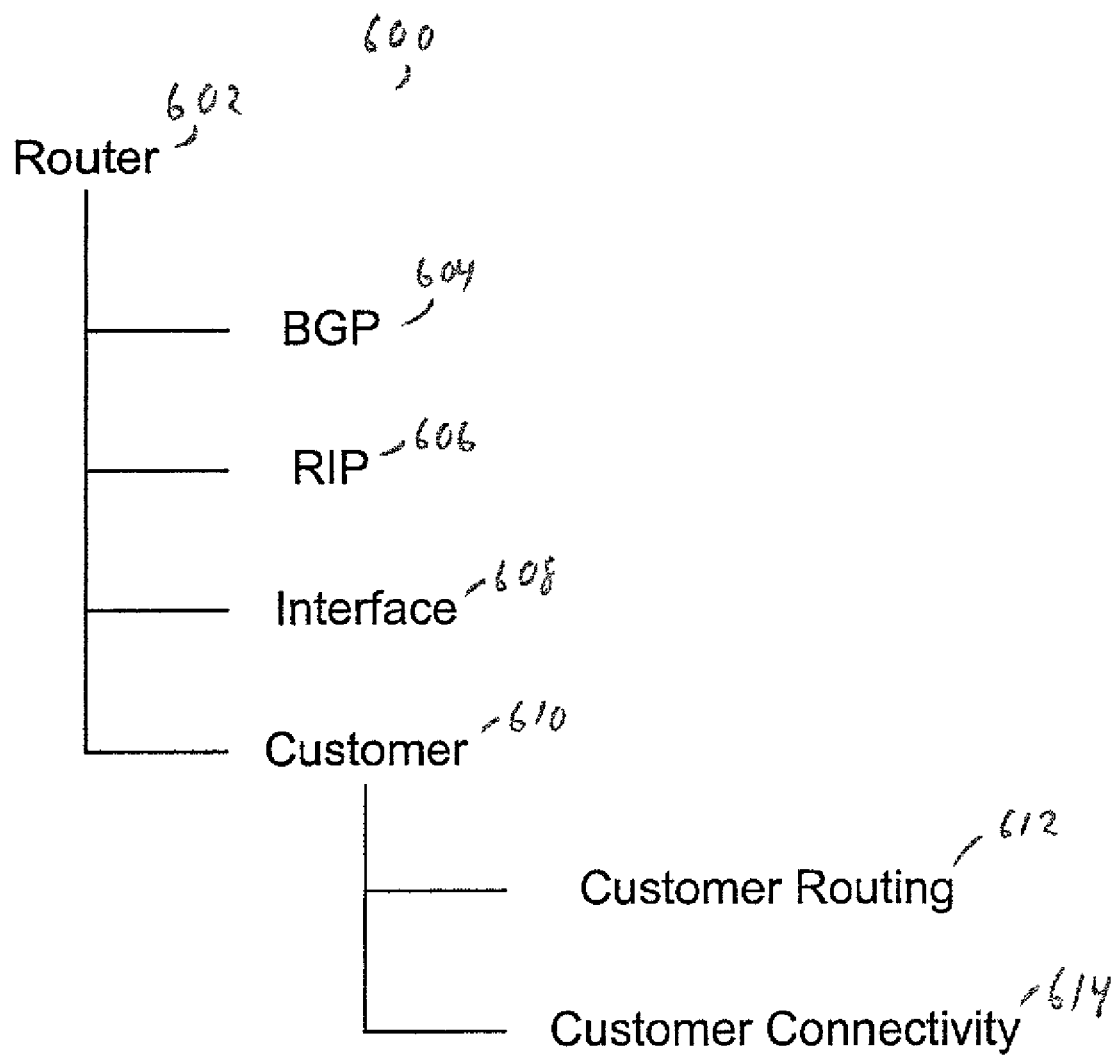
FIG. 20 is a target level hierarchy for an illustrative example.

FIG. 20 provides an illustrative target level schema 600 which is assumed to have been created by a network architect for an Internet Service Provider (ISP). In this example, the network architect has determined that configuration of routers in the network can be broken down in several ways.

First, basic router functionality can be configured, corresponding to the "Router" target level 602. Second, the routing procotols can be configured as to where to send packets, corresponding to the "BGP" and "RIP" subtarget levels 604, 606 respectively. Third, the interfaces on the router can be configured so that the router can communicate, corresponding to the "Interface" subtarget level 608. Finally, the router can be configured to support the customers served by the router, corresponding to the "Customer" subtarget level 610.

The "Customer" subtarget level 610 is broken down further into two subtarget levels. The first of these subtarget levels is a "Customer Routing" subtarget level 612 for configuring a customer's routing information. This could include, for example, setting up static routes, and deciding what routing information is to be advertised to the customer. The second of these subtarget levels is a "Customer Connectivity" subtarget level 614 for which a customer's connectivity information is configured. This can include, for example, setting up permanent virtual circuits (PVCs) to the customer.

For this example, assume that there is a single policy in the "Customer Routing" subtarget level 612. This policy, called "Customer Static Route," will create a static route for each of the customer's networks.

Figure 21:
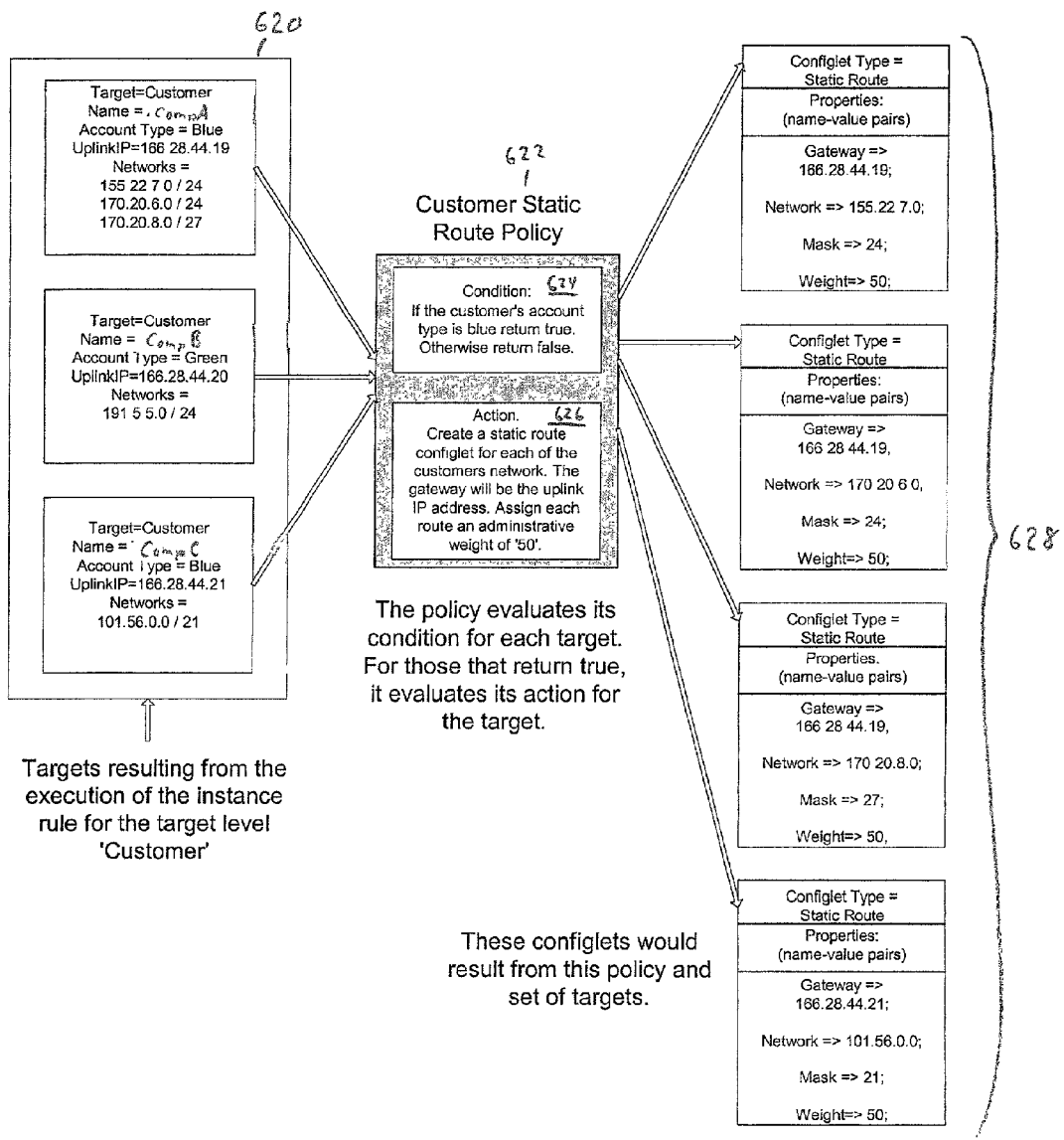
FIG. 21 is a schematic diagram illustrating the operation of a policy upon target levels to produce configlets for the example of FIG. 20.

FIG. 21 is a schematic diagram illustrating the operation of a policy upon target levels to produce configlets for the example of FIG. 20.

Assume for this example that the ISP updates its routers' static routes once a day. With the present invention, this is a simple task. Assume that operations personnel want to generate just a partial configuration using the "Customer Routing" subtarget level 612, to insure that only the "Customer Static Route" policy 622 is executed. This will result in a partial configuration that contains only the static routes.

One benefit of being able to generate partial configuration is that the likelihood of propagating an unintended change is reduced. In addition, some routers, or interfaces on routers, will reset themselves if certain parameters are set. For example, setting the IP address on an interface, even if it is identical to the current IP address on the interface, might cause the interface to reset, causing the interface to be unreachable for some length of time. This can be avoided by propagating just a partial configuration, as can be generated by the present invention, to the router.

To continue with the example, assume that the operations personnel, or user, decides to update the static routes on router 'A'. To ensure that the minimal configuration for static routes is generated, the user instructs the policy engine 60 (FIG. 4) to generate a partial configuration for router 'A', selecting the "Customer Routing" target level 612 (FIG. 20).

The policy engine first determines the proper context for the operation, by "walking" the target level schema 600, and executing the target instance rules as appropriate. In this example, when the policy engine executes the customer target instance rule (not shown) for router 'A', three customers 620, i.e., target instances of type customer, are found that are served by router 'A': CompA, CompB and CompC.

The object is to execute only the policies associated with (or contained in) the Customer Routing subtarget level 612. Thus, each customer target instance 620 is passed to the Customer Static Route policy 622. The policy 622 evaluates its condition 624 for each target instance. If the condition 624 returns true, then the policy's action 626 is executed.

In this example, the condition 624 return "true" for the customers "CompA" and "CompC" because the account type of each is "blue." The policy 622 creates a static route for each network that the customer has, where a static route is basically providing information that states: "To get to the network defined by <network address> and <mask>, send the packet to the gateway <customer uplink IP address>." The policy 622 also assigns an administrative weight to this information. For example, a router might know of multiple ways to reach a particular network. Weights are used to give preference to some routes.

In the example, CompA has three networks that require a static route, while CompB has a single network that needs to be set up. After the policy has been executed for these customer target instances, four configlets 628 of type static route will have been created.

Figure 22:
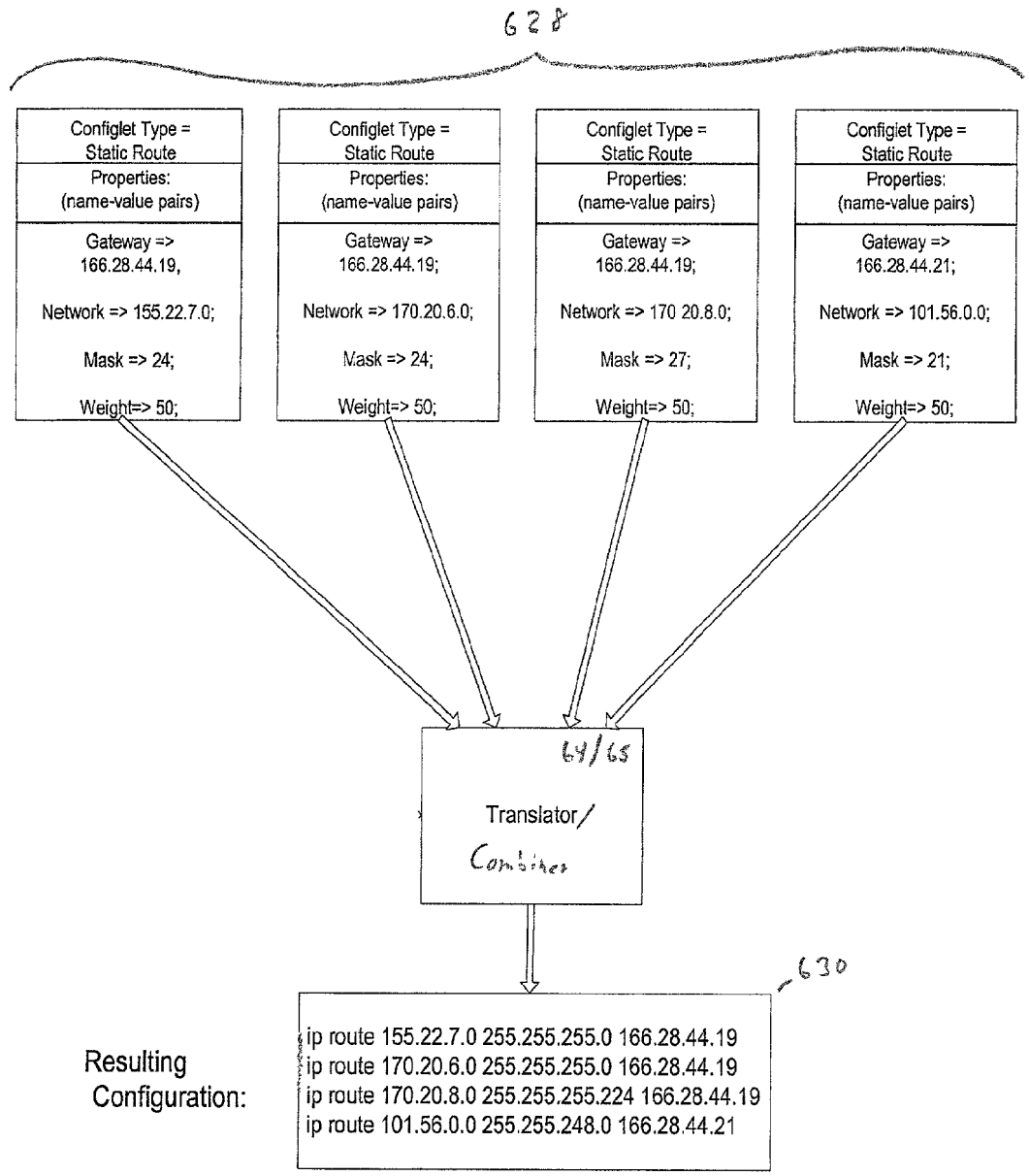
FIG. 22 is a schematic diagram illustrating the translation and combining of the configlets of FIG. 21 to produce a vendor-specific configuration.

FIG. 22 is a schematic diagram illustrating the translation and combining of the configlets 628 produced in FIG. 21 to produce a vendor-specific configuration 630.

The configlets 628 here are vendor-neutral, although other policies could create vendor-specific configlets or configlets having both vendor-neutral and vendor-specific properties. In order to effect a configuration change, a translator 64/combiner 65 translates the configlets 628 into the specific vendor syntax and combines them into a partial, vendor-specific configuration 630.

In this example, the configuration manager has determined that router 'A' is a product of, say, Vendor Q. The translator converts the configlets into a Vendor Q-configuration 630, which in this case is a partial configuration. At this point, the configuration 630 could be pushed up to a device and update the static routes.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network configuration management system comprising:
    a reverse translator configured to receive a first vendor-specific configuration file from a first network device and configured to reverse translate the first vendor-specific configuration tile into at least one vendor-neutral configlet;
    a configuration file generator configured to generate a second vendor-specific configuration file using the at least one vendor-neutral configlet, the second vendor-specific configuration file corresponding to a second network device; and
    a loader for loading the second vendor-specific configuration file to the second network device;
    wherein the first vendor-specific configuration file is usable to configure the operation of the first network device and the second vendor-specific configuration file is usable to configure the operation of the second network device;
    a translator which translates the at least one of the plurality of vendor-neutral configlet to a vendor-specific configlet.

2. The system of claim 1, wherein the plurality of vendor-neutral configlets are organized based on a selected feature set target level.

3. The system of claim 1, wherein the system retains login information to the devices, such that a user desiring to connect to a device must log in to the system, the system connecting to the device.

4. The system of claim 3, wherein the system passes commands from the user to the device, and responses from the device to the user.

5. The system of claim 1, wherein the second vendor-specific configuration file comprises a full configuration.

6. The system of claim 1, wherein the second vendor-specific configuration file comprises a partial configuration.

7. The system of claim 1, wherein the first vendor-specific configuration file comprises a full configuration.

8. The system of claim 1, wherein the first vendor-specific configuration file comprises a partial configuration.

* * * * *

UNITED STATES PATENT AND TRADEMARK OFFICE
CERTIFICATE OF CORRECTION

PATENT NO.        : 7,150,037 B2
APPLICATION NO.   : 09/877209
DATED             : December 12, 2006
INVENTOR(S)       : Jonathan S. Wolf et al.

It is certified that error appears in the above-identified patent and that said Letters Patent is hereby corrected as shown below:

Col. 18, line 47, delete "tile" and insert --file--.

Signed and Sealed this

Eighteenth Day of December, 2007

JON W. DUDAS
*Director of the United States Patent and Trademark Office*